(12) United States Patent
Ohyama et al.

(10) Patent No.: US 8,441,584 B2
(45) Date of Patent: May 14, 2013

(54) STEREOSCOPIC IMAGE DISPLAYING APPARATUS

(75) Inventors: Tsuyoshi Ohyama, Tokyo (JP); Masato Imai, Aichi (JP); Tsutomu Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 352 days.

(21) Appl. No.: 12/854,344

(22) Filed: Aug. 11, 2010

(65) Prior Publication Data
US 2011/0043715 A1    Feb. 24, 2011

(30) Foreign Application Priority Data

Aug. 20, 2009    (JP) ................ P2009-191035

(51) Int. Cl.
*G02F 1/1343*    (2006.01)
*G02F 1/1335*    (2006.01)
*G02B 27/22*    (2006.01)

(52) U.S. Cl.
USPC ............ 349/15; 349/141; 349/143; 349/145; 349/147; 359/462

(58) Field of Classification Search .............. 349/15, 349/139, 141, 143, 145, 147; 359/462
See application file for complete search history.

(56) References Cited

U.S. PATENT DOCUMENTS
7,453,529 B2    11/2008    Nam et al.

FOREIGN PATENT DOCUMENTS
JP    2857429    11/1998
JP    2006-119634    8/2010

*Primary Examiner* — Uyen Chau N Le
*Assistant Examiner* — Michael Mooney
(74) *Attorney, Agent, or Firm* — K&L Gates LLP

(57) ABSTRACT

A stereoscopic image displaying apparatus is provided. The stereoscopic image displaying apparatus, including: an image generation section having a plurality of pixels for a plurality of colors arranged in a two-dimensional matrix and adapted to drive the pixels for the colors to generate a color image; and a parallax applying section adapted to apply a parallax to the image to allow color display of a three-dimensional image and capable of changing over a parallax direction between a first direction of the color image and a second direction perpendicular to the first direction. The parallax applying section has a first parallel state and a second parallel state. The image generation section and the parallax application section are configured so that the rates of the colors at the pixels for the colors corresponding to light transmission regions between adjacent ones of the parallax barrier regions are uniform or got closer in both of the parallel states.

13 Claims, 26 Drawing Sheets

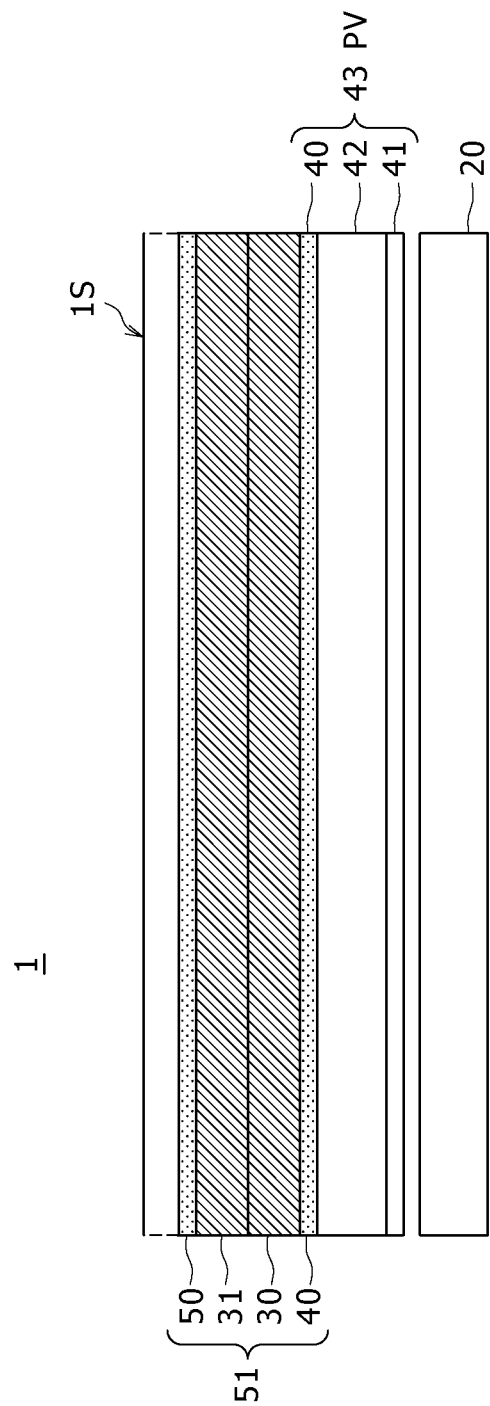

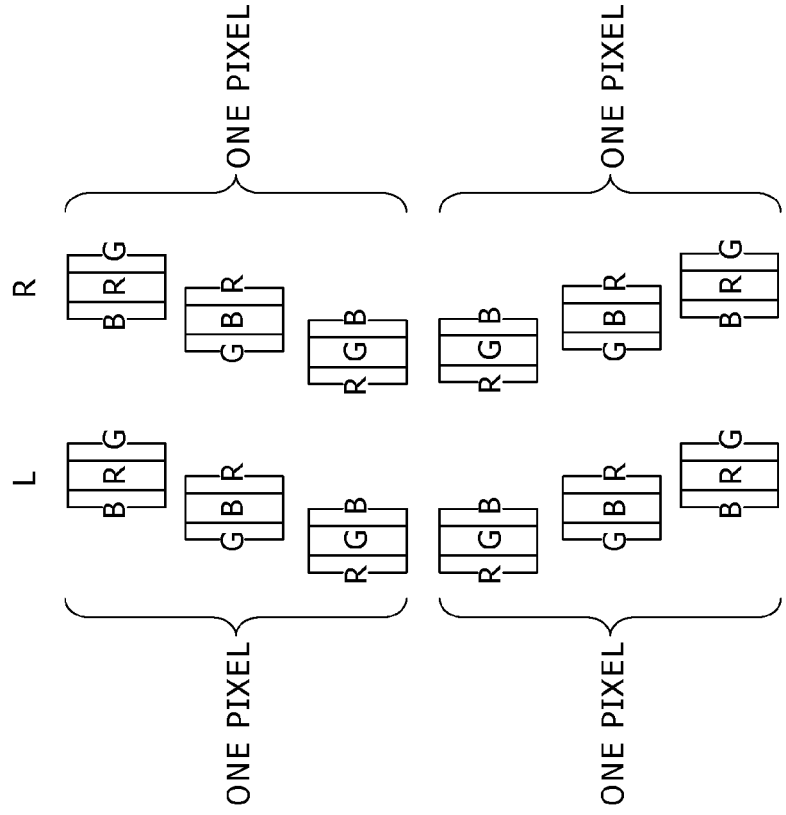
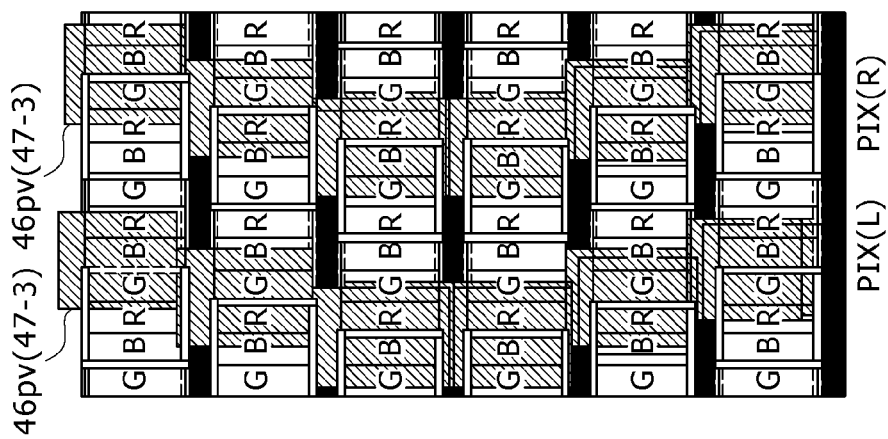

ORIGINAL IMAGES

STEREOSCOPIC IMAGE

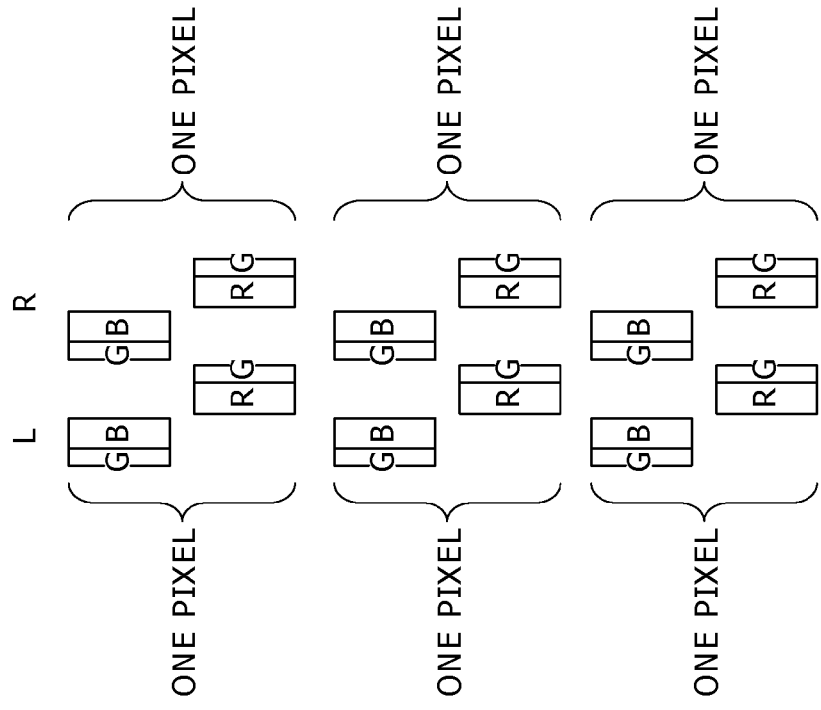
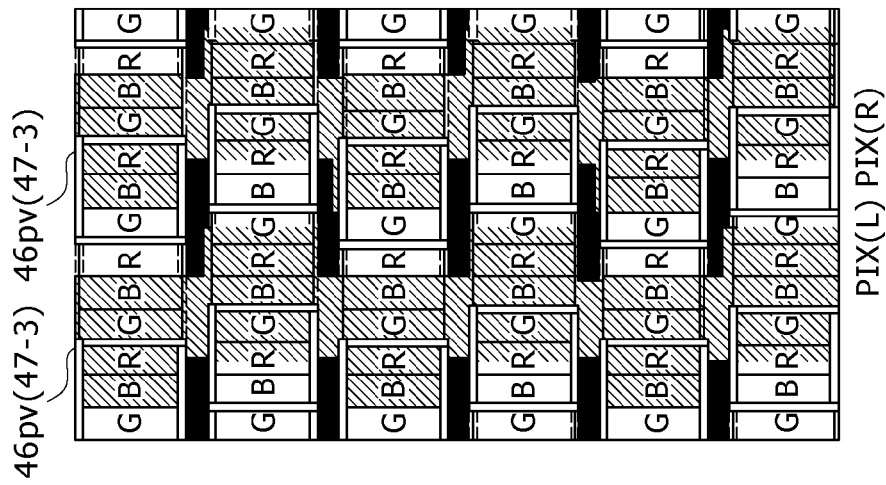

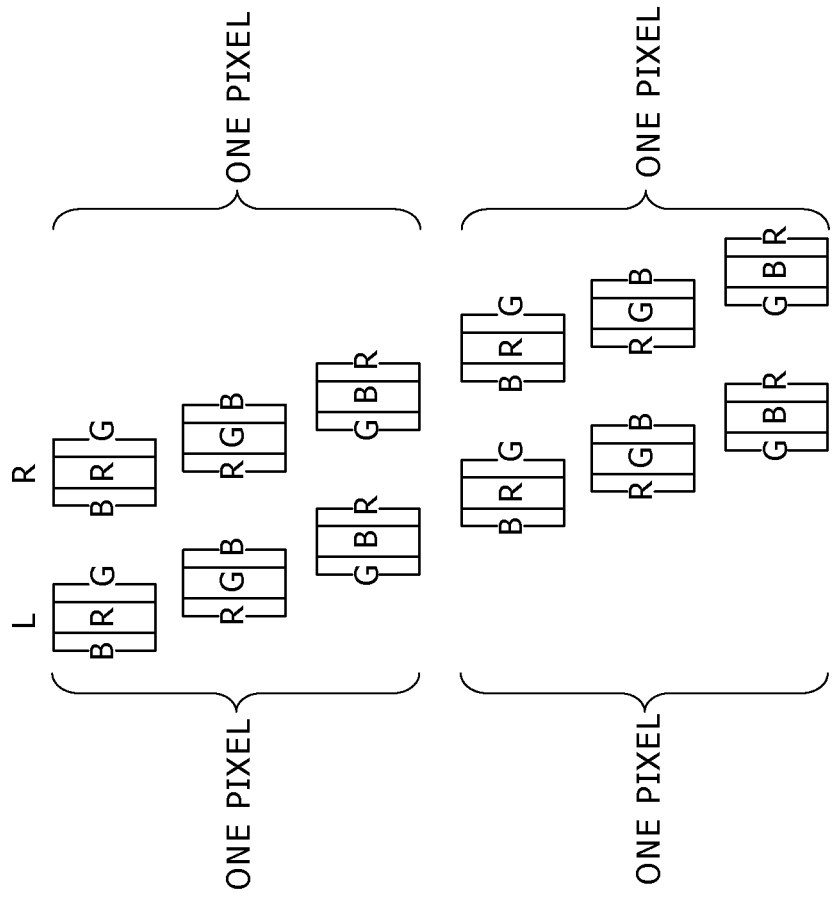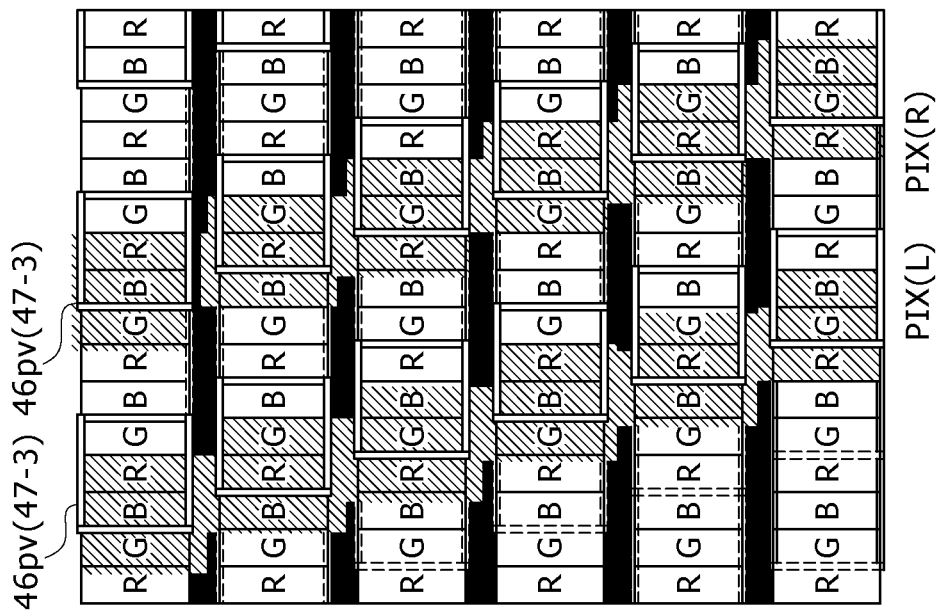

FIG.18

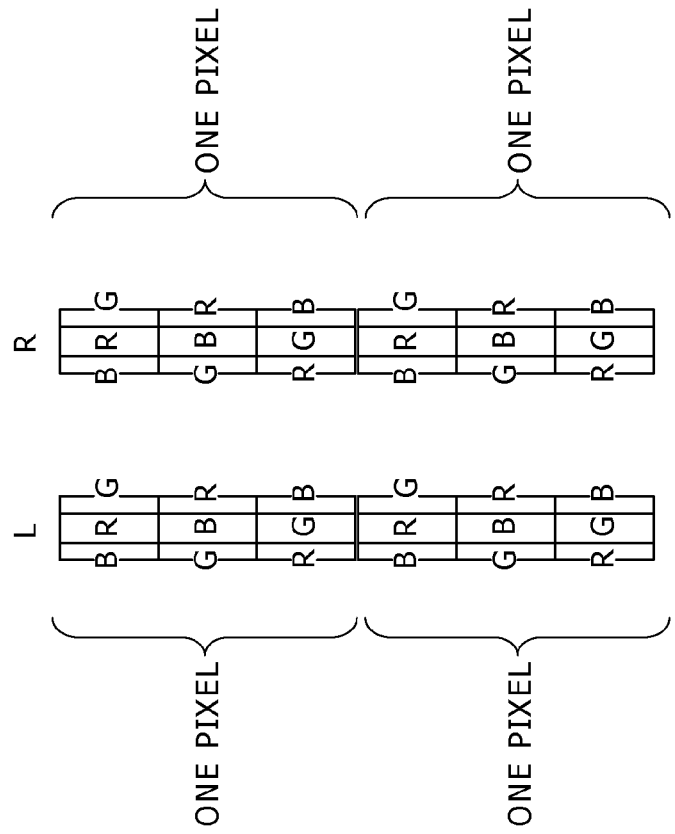
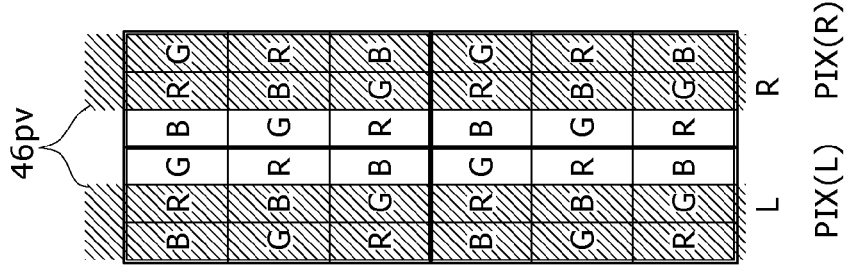

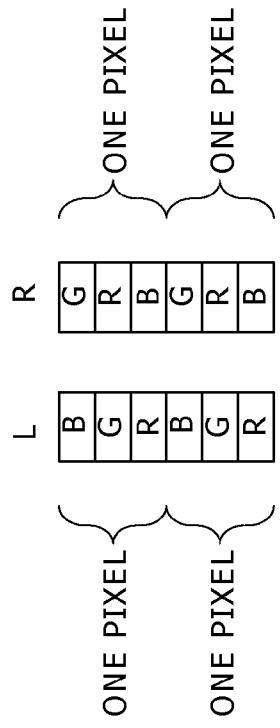
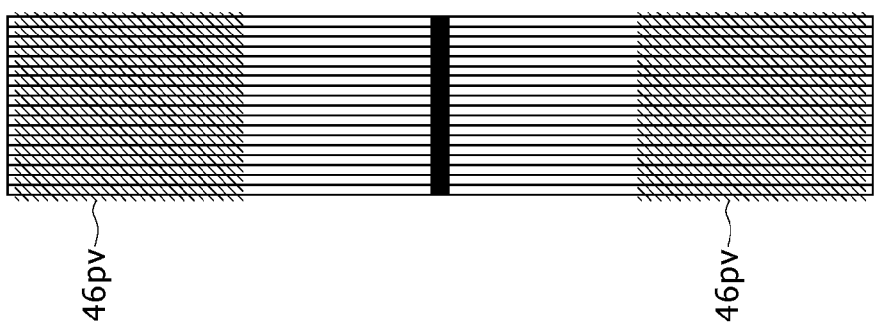

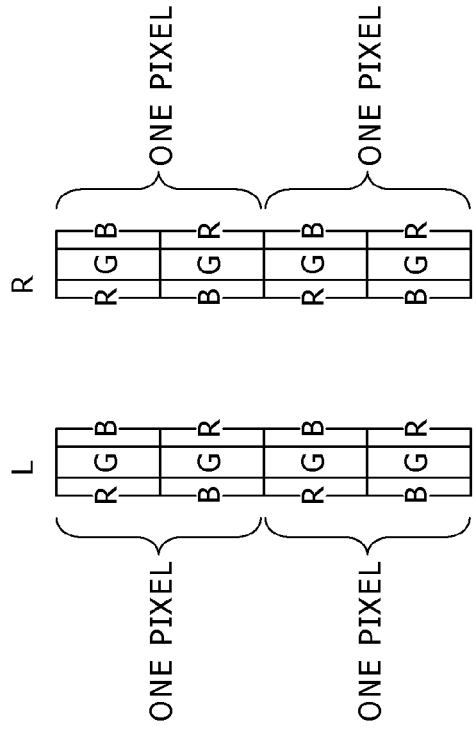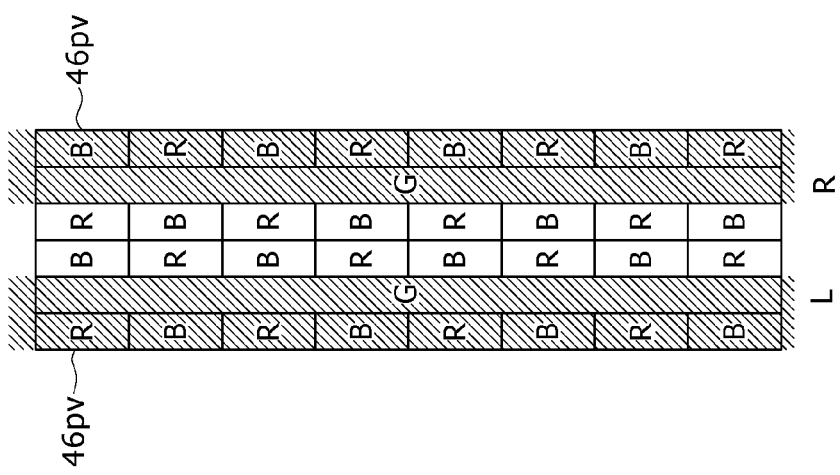

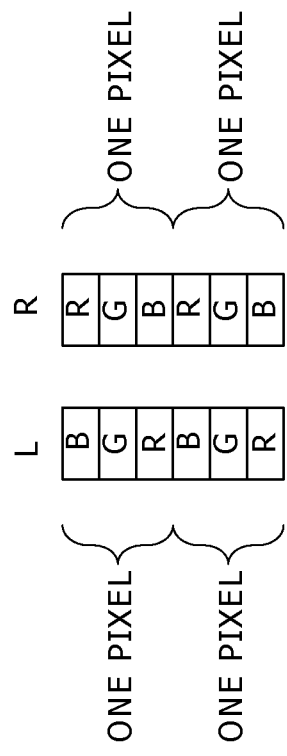
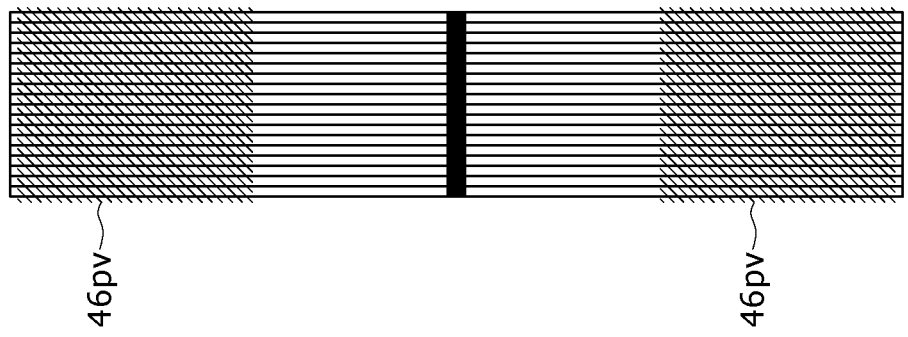

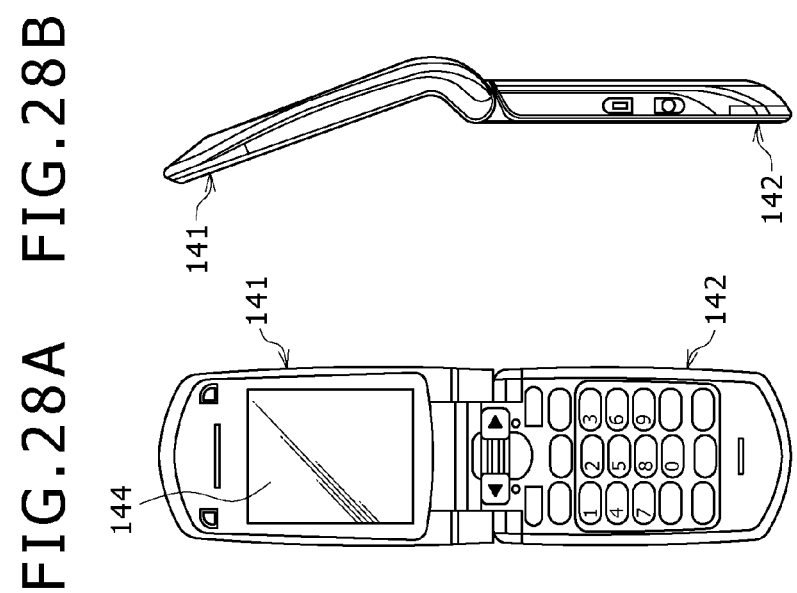
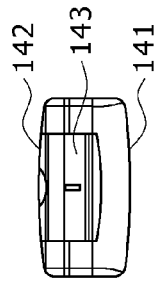
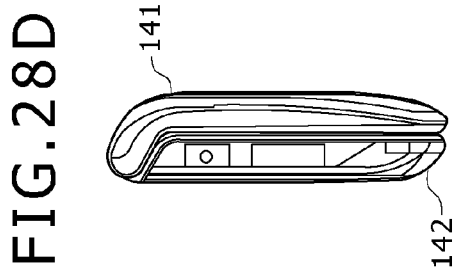
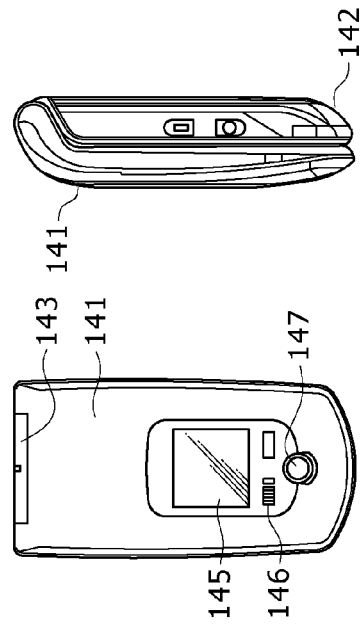
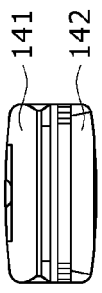

STEREOSCOPIC IMAGE DISPLAYING APPARATUS

CROSS REFERENCES TO RELATED APPLICATIONS

The present application claims priority to Japanese Priority Patent Application JP 2009-191035 filed in the Japan Patent Office on Aug. 20, 2009, the entire content of which is hereby incorporated by reference.

BACKGROUND

The present application relates to a stereoscopic image displaying apparatus including a parallax barrier application apparatus which can change over the longitudinal direction, that is, a barrier line direction of a parallax barrier between two perpendicular directions of a display screen.

In recent years, various methods have been proposed for three-dimensional (3D) display.

As the background, television (TV) broadcasting compatible with 3D display has started, and also movie works for 3D display are increasing. For such TV broadcasts and movies, principally a method which uses polarized glasses is applied.

Meanwhile, for mobile applications, some portable telephone sets and notebook-type personal computers are ready for 3D display. In this instance, a method which uses a parallax barrier as a parallax applying section without using glasses is applied. In this method, the image displaying method is changed over between two-dimensional display and three-dimensional display using a liquid crystal display element. Therefore, also an ordinary two-dimensional image can be displayed. An apparatus which adopts the method described is disclosed, for example, in Japanese Patent No. 2857429 (hereinafter referred to as Patent Document 1).

In some display apparatus for mobile applications, a display image can rotate by 90 degrees. In this instance, it is desired to display an image by 3D display in both of a landscape mode or orientation in which the screen is viewed in a horizontally elongated state and a portrait mode or orientation in which the screen is viewed in a vertically elongated state. In this instance, the parallax barrier has to be formed in regard to both of the horizontal and vertical directions. A technique for implementing this is disclosed, for example, in Japanese Patent Laid-Open No. 2006-119634 (hereinafter referred to as Patent Document 2).

In order to configure a display apparatus to be ready for 3D display in both of the landscape mode and the portrait mode like the technique of Patent Document 2, transparent ITO (Indium Tin Oxide) electrodes for driving a liquid crystal layer of the parallax barrier in a layer thicknesswise direction are formed in stripes in accordance with the pixel pitch.

SUMMARY

In this instance, for example, if an image displaying section has a pixel configuration wherein three-primary color filters are disposed at subpixels, then it is necessary for the parallax barrier to satisfy conditions for light blocking and light transmission both before and after the screen rotates by 90 degrees with respect to subpixels for red (R), green (G) and blue (B).

For example, in the case of color filter arrangement wherein subpixels for red (R), green (G) and blue (B) are disposed in stripes for each color, if the parallax barrier overlaps with color filter arrangement such that parallel stripes thereof extend perpendicularly to the color stripes, then the ratios of the colors in light transmission regions (also referred to as opening regions) between the parallax barrier stripes are equal to each other. In this instance, a good three-dimensional display image can be obtained without suffering from such loss of color balance as applying some tint to a screen image because the ratio of the number of subpixels only for a certain color is higher.

On the contrary, if the stripes of the parallax barrier extend in parallel to the color stripes of R, G and B, then the relative positional relationship of the barrier stripes and the color stripes suffers from some non-uniformity.

For example, in light transmission regions between the parallax barrier stripes, the rate at which green (G) subpixels overlap may be higher than the rate at which red (R) subpixels overlap, or otherwise, the rate at which blue (B) Subpixels overlap may be higher. This applies a tint of a particular color to the entire 3D display image, resulting in deterioration of the color display quality.

In this manner, where it is tried to display a three-dimensional (3D) image in both of the landscape mode and the portrait mode on a display apparatus which can rotate a display image thereof by 90 degrees such as a display apparatus for a mobile application, it is necessary to prevent mismatching between the color arrangement of R, G and B and the direction of the stripes of the parallax barrier.

Therefore, the present application in an embodiment provides a stereoscopic image displaying apparatus which includes a parallax applying section capable of changing over a parallax direction between two directions of a display screen perpendicular to each other upon display of a three-dimensional image and does not lose color balance to whichever direction the parallel direction is changed over between the two directions.

According to an embodiment, there is provided a stereoscopic image displaying apparatus including an image generation section having a plurality of pixels for a plurality of colors arranged in a two-dimensional matrix and adapted to drive the pixels for the colors to generate a color image, and a parallax applying section adapted to apply a parallax to the color image to allow color display of a three-dimensional image and capable of changing over a parallax direction between a first direction of the color image and a second direction perpendicular to the first direction, the parallax applying section having a first parallel state wherein a longitudinal direction of a plurality of parallax barrier regions of a parallax barrier spaced from each other for applying the parallax coincides with the first direction and a second parallel state wherein the longitudinal direction of the parallax barrier regions of the parallax barrier coincides with the second direction, the image generation section and the parallax application section being configured so that the rates of the colors at the pixels for the colors corresponding to light transmission regions between adjacent ones of the parallax barrier regions are uniform or got closer in both of the first parallel state and the second parallel state.

In the stereoscopic image displaying apparatus, the parallax applying section controls the formation direction of the parallax barrier such that the first parallel state and the second parallel state are established, for example, when the stereoscopic image displaying apparatus is to be viewed in an ordinary state and when the stereoscopic image displaying apparatus is to be viewed in a state wherein it is rotated by 90 degrees, respectively.

Although the longitudinal direction of the parallax barrier regions differs by 90 degrees between the first and second parallel states, when light is restricted by the parallax barrier, the uniformity in color, that is, the color balance, is sometimes lost in a region in which light between the parallax barrier regions in the color arrangement of the image generation section for generating a color image passes.

The parallax applying section having the configuration described above forms the parallax barrier shaped such that each of the parallax barrier regions thereof includes a plurality of rectangular portions displaced from each other in a direction perpendicular to the longitudinal direction in at least one of the first and second parallel states. Therefore, it is possible to carry out periodic control to block or transmit light using the rectangular portions in accordance with the periodic color arrangement. By carrying out this control, the light amount can be controlled so as to be equal among the three colors, and color balance can be achieved. Or, the image generation section is configured so as to establish color balance also with the color arrangement.

According to another embodiment, there is provided a stereoscopic image displaying apparatus including an image generation section having a plurality of pixels for a plurality of colors arranged in a two-dimensional matrix and adapted to drive the pixels for the colors to generate a color image, and a parallax applying section adapted to apply a parallax to the color image to allow color display of a three-dimensional image and capable of changing over a parallax direction between a first direction of the color image and a second direction perpendicular to the first direction, the parallax applying section having a first parallel state wherein a longitudinal direction of a plurality of parallax barrier regions of a parallax barrier spaced from each other for applying the parallax coincides with the first direction and a second parallel state wherein the longitudinal direction of the parallax barrier regions of the parallax barrier coincides with the second direction, each of the parallax barrier regions of the parallax barrier being shaped so as to include a plurality of rectangular portions which are displaced from each other in a direction perpendicular to the longitudinal direction in at least one of the first parallel state and the second parallel state so that the rates of the colors at the pixels for the colors corresponding to the light transmission regions between adjacent ones of the parallax barrier regions are uniform or got closer in both of the first parallel state and the second parallel state.

According to a further embodiment, there is provided a stereoscopic image displaying apparatus including an image generation section having a plurality of pixels for a plurality of colors arranged in a two-dimensional matrix and adapted to drive the pixels for the colors to generate a color image, and a parallax applying section adapted to apply a parallax to the color image to allow color display of a three-dimensional image and capable of changing over a parallax direction between a first direction of the color image and a second direction perpendicular to the first direction, the parallax applying section having a first parallel state wherein a plurality of parallax barrier regions of a parallax barrier spaced from each other for applying the parallax is formed in the first direction and a second parallel state wherein the parallax barrier regions of the parallax barrier is formed in the second direction, the arrangement of the plural colors in the matrix arrangement being determined so that the rates of the colors at the pixels for the colors corresponding to light transmission regions between adjacent ones of the parallax barrier regions are uniform or got closer in both of the first parallel state and the second parallel state.

In summary, according to an embodiment, a stereoscopic image displaying apparatus can be provided which includes a parallax applying section capable of changing over a parallax direction between two directions of a display screen perpendicular to each other upon display of a three-dimensional image and does not lose color balance to whichever direction the parallel direction is changed over between the two directions.

Additional features and advantages are described herein, and will be apparent from the following Detailed Description and the figures.

BRIEF DESCRIPTION OF THE FIGURES

FIG. 1 is a schematic sectional view showing a structure of a stereoscopic image displaying apparatus which can carry out 3D display of an embodiment;

FIGS. 6A and 6B are schematic views illustrating a relationship between parallax barrier regions and arrangement of pixels and color filters and color arrangement of light from pixels entering the eyes, respectively, in the stereoscopic image displaying apparatus of the first embodiment;

FIGS. 13A and 13B are schematic views illustrating a relationship between parallax barrier regions and arrangement of pixels and color filters and color arrangement of light from pixels entering the eyes, respectively, in the stereoscopic image displaying apparatus of the second embodiment;

FIGS. 16A and 16B are schematic views illustrating a relationship between parallax barrier regions and arrangement of pixels and color filters and color arrangement of light from pixels entering the eyes, respectively, in the stereoscopic image displaying apparatus of the fourth embodiment;

FIG. 18 is a schematic plan view showing color arrangement of color filters in a stereoscopic image displaying apparatus according to a fifth embodiment;

FIGS. 19A and 19B are schematic views illustrating a relationship between parallax barrier regions and arrangement of pixels and color filters in the portrait mode and color arrangement of light from pixels entering the eyes, respectively, in the stereoscopic image displaying apparatus of the fifth embodiment;

FIGS. 20A and 20B are schematic views illustrating a relationship between parallax barrier regions and arrangement of pixels and color filters in the landscape mode and color arrangement of light from pixels entering the eyes, respectively, in the stereoscopic image displaying apparatus of the second embodiment;

FIGS. 22A and 22B are schematic views illustrating a relationship between parallax barrier regions and arrangement of pixels and color filters in the portrait mode and color arrangement of light from pixels entering the eyes, respectively, in the stereoscopic image displaying apparatus of the sixth embodiment;

FIGS. 23A and 23B are schematic views illustrating a relationship between parallax barrier regions and arrangement of pixels and color filters in the landscape mode and color arrangement of light from pixels entering the eyes, respectively, in the stereoscopic image displaying apparatus of the second embodiment;

FIGS. 28A and 28B are a front elevational view and a side elevational view, respectively, showing a portable telephone set in an unfolded state and FIGS. 28C, 28D, 28E, 28F and 28G are a front elevational view, a left side elevational view, a right side elevational view, a top plan view and a bottom plan view, respectively, showing the portable telephone set in a folded state.

DETAILED DESCRIPTION

Figure 2A:
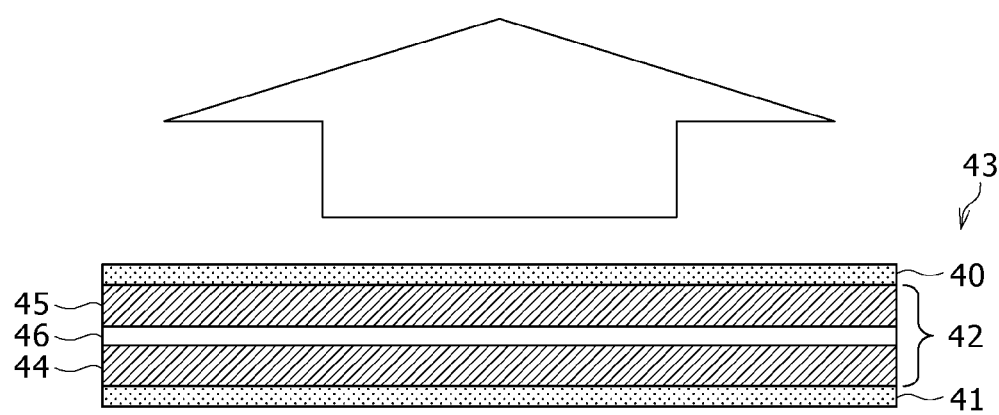
FIGS. 2A and 2B are schematic sectional views showing a structure of a parallax barrier of the stereoscopic image displaying apparatus of an embodiment.

The present application is described below with reference to the accompanying drawings according to an embodiment. In an embodiments, the stereoscopic image displaying apparatus is applied principally to a liquid crystal display apparatus having a color filter array wherein subpixels are arranged as stripes of individual colors extending in parallel to each other. The description is given in the following order:

1. First Embodiment: a stereoscopic image displaying apparatus wherein third and fourth (PV) electrodes have a shape wherein a pattern of rectangular electrode portions displaced from each other by a plural number of times is folded back and a parallax barrier corresponding to the shape is generated 2. Second Embodiment: a stereoscopic image displaying apparatus wherein third and fourth (PV) electrodes have a shape wherein a pattern of rectangular electrode portions displaced from each other once is folded back and a parallax barrier corresponding to the shape is generated 3. Third Embodiment: a stereoscopic image displaying apparatus which is a modification to the stereoscopic image displaying apparatus of the second embodiment and wherein third and fourth (PV) electrodes have a shape wherein a connection portion of rectangular electrode portions is elongated 4. Fourth Embodiment: a stereoscopic image displaying apparatus wherein third and fourth (PV) electrodes have a shape wherein rectangular electrode portions are successively displaced from each other without being folded back and a parallax barrier corresponding to the shape is generated 5. Modification 1

6. Modification 2

7. Fifth Embodiment: a stereoscopic image displaying apparatus wherein a color drift is prevented by color arrangement and colors are disposed alternately in both of two directions of matrix arrangement 8. Sixth Embodiment: a stereoscopic image displaying apparatus wherein a color drift is prevented by color arrangement and a particular color such as G is disposed in stripes in one direction of matrix arrangement and the other two colors are disposed alternately along a direction of the stripes 9. Modification 3

10. Application Examples to an Electronic Apparatus

In the following, preferred embodiments according to the present application are described with reference to the drawings.

1. First Embodiment

[Sectional Structure of the Display Section]

FIG. 1 is a schematic sectional structure view of a stereoscopic image displaying apparatus capable of carrying out three-dimensional display.

Referring first to FIG. 1, the stereoscopic image displaying apparatus 1 includes an optical modulation panel 51 serving as an image generation section, a parallax barrier (PV) 43 serving as a parallax applying section, and a backlight 20 disposed in order from the outer face 1S side from which an image is outputted.

Though not particularly shown, the backlight 20 is an illumination apparatus for exclusive use with an image displaying apparatus which includes a light guiding plate, a light source such as an LED, a light source driving section, a reflection sheet, a prism sheet and so forth assembled as a unitary member.

The optical modulation panel 51 includes a TFT substrate 30 on the backlight 20 side and an opposing substrate 31 on the outer face 1S side. Various electrodes and elements and optical function layers not shown are formed in a suitably insulated state and a suitably flattened state on the TFT substrate 30 and the opposing substrate 31.

More particularly, thin film transistors (TFTs) which serve as pixel electrodes or driving elements are formed on the principal surface of the TFT substrate 30 on the outer face 1S side in repetitive patterns for individual pixels. Further, where an in-plane switching (IPS) display mode is adopted, an opposing electrode (hereinafter referred to sometimes as common electrode) embedded in the flattening film is formed in a lower layer of the pixel electrodes. A first orientation film is formed on an upper layer to a layer on which the pixel electrodes and the TFTs are disposed.

On the other hand, a color filter, a flattening film and a second orientation film are formed on one face of the opposing substrate 31 on the TFT side. While the color filters can be disposed arbitrarily, for example, the color filters are disposed in the form of parallel stripes wherein a subpixel on which a filter of the same color is disposed is formed as one color stripe. Here, the term "subpixel" signifies a finer division in the optical modulation panel 51 which configures the pixel described above, and one pixel is configured from three subpixels to each of which, for example, one of red (R), green (G) and blue (B) is allocated. At this time, in the parallel color stripe disposition, color stripes of R, G and B extending in one direction in the plane of the optical modulation panel 51 are determined as one set, and the set is repetitively disposed in the other direction.

The TFT substrate 30 is pasted to the opposing substrate 31 with a spacer not shown interposed therebetween so that an internal space is formed therebetween. At this time, the TFT substrate 30 and the opposing substrate 31 are pasted such that the face of the TFT substrate 30 on which the pixel electrodes, TFTs and first orientation film are formed and the face of the opposing substrate 31 on which the color filters and the second orientation film are formed are opposed to each other.

Liquid crystal is injected into the internal space between the two boards from a portion at which the spacer is not formed. Thereafter, the injection portion of the liquid crystal is closed. Consequently, the liquid crystal is encapsulated in a cell in which the two boards are pasted to each other such that a liquid crystal layer is formed. Since the liquid crystal layer contacts with the first orientation film and the second orientation film, the orientation direction of liquid crystal molecules depends upon the rubbing direction of the orientation films.

The pixel electrode for each pixel and the opposing electrode or common electrode commonly used among the pixels are disposed on the liquid crystal layer formed in such a manner as described above in a neighboring relationship with each other in a thicknesswise direction of the layer. The two kinds of electrodes are provided to apply a voltage to the liquid crystal layer. The two electrodes can be disposed in two different manners including a manner wherein they are disposed with the liquid crystal layer sandwiching therebetween (driving mode in the vertical direction) and another manner wherein the two electrodes are disposed on the TFT substrate 30 side with respect to the liquid crystal layer (driving mode in the transverse direction; for example, IPS mode).

In the case of the IPS mode, while the pixel electrodes and the opposing electrode or common electrode are separated from each other in an isolated state, the opposing electrode on the lower layer side applies an electrical action from between patterns of the pixel electrodes contacting with the liquid crystal layer on the upper layer side to the liquid crystal. Therefore, the direction of the electric field in the driving mode in the transverse direction is the transverse direction. On the other hand, where the two electrodes are disposed with the liquid crystal layer sandwiched therebetween from the thicknesswise direction, the direction of the electric field is the vertical direction or thicknesswise direction.

In whichever one of driving mode specifications the electrodes are disposed, a voltage can be applied in a matrix to the liquid crystal layer by means of the two electrodes upon displaying driving. Therefore, the liquid crystal layer functions as a function layer for optically modulating the transmission light therethrough, that is, as an optical modulation layer. The liquid crystal layer carries out gradation display in response to the magnitude of the voltage applied to the pixel electrode based on an image signal applied to a display driver not shown.

As shown in FIG. 1, a first polarization plate 40 is pasted on the other main face or reverse face of the TFT substrate 30. A second polarization plate 50 which makes a pair with the first polarization plate 40 is pasted on the face of the opposing substrate 31 on the outer face 1S side.

[Sectional Structure and Operation of the Parallax Barrier]

Figure 2B:
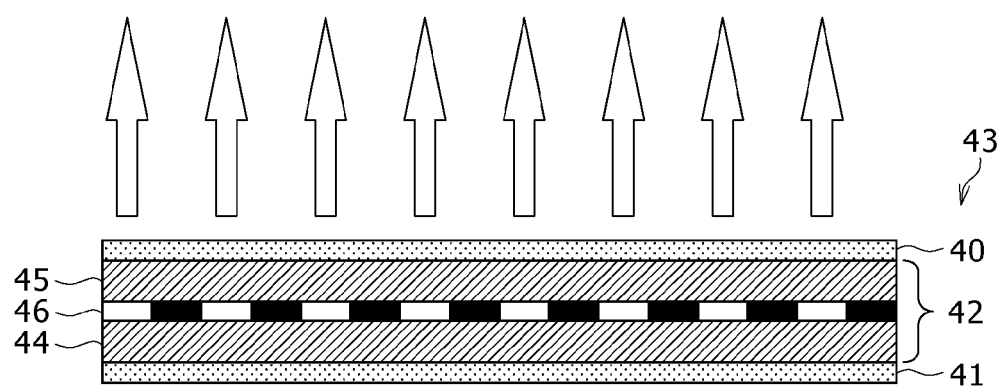

FIGS. 2A and 2B schematically show a sectional structure of the parallax barrier.

Referring to FIGS. 2A and 2B, the parallax barrier 43 shown includes, as shown also in FIG. 1, a first polarization plate 40, a third polarization plate 41 and an optical controlling layer 42 disposed between the first polarization plate 40 and the third polarization plate 41, which are used also as polarization plates of the optical modulation panel 51 shown in FIG. 1.

The optical controlling layer 42 functions, for example, as switching liquid crystal and has a structure wherein a switching liquid crystal layer 46 is encapsulated between a first PV substrate 44 and a second PV substrate 45.

Planar light from the backlight 20 in FIG. 1 is converted into linearly polarized light by the third polarization plate 41 and then enters the switching liquid crystal layer 46. Light from the switching liquid crystal layer 46 is absorbed by or passes through the first polarization plate 40 in response to a state of the switching liquid crystal. The switching liquid crystal layer 46 has a function of partially blocking incident light through an interaction of the third polarization plate 41 and the first polarization plate 40. In order to implement the function just described, it is necessary to partially turn on and off a voltage to be applied to the switching liquid crystal layer 46.

The switching of the voltage is carried out, for example, using a first electrode and a second electrode formed on a face of the first PV substrate 44 on the liquid crystal layer side and a third electrode and a fourth electrode formed on a face of the second PV substrate 45 on the liquid crystal layer side. It is to be noted that conversely the first and second electrodes may be provided on the second PV substrate 45 side and the third and fourth electrodes may be provided on the first PV substrate 44 side. Details of the shape of the first to fourth electrodes, an application method of a voltage in PV control and so forth are hereinafter described.

By the configuration described above and switching of the liquid crystal application voltage using a subpixel pitch as a minimum unit, an output state of planar light corresponding to absence of a parallax shown in FIG. 2A and another output state of discrete parallel stripe light corresponding to presence of a parallax shown in FIG. 2B are changed over. In the output state of the parallel stripe light, a region in which light is blocked is hereinafter referred to as "parallax barrier" or "parallax barrier region" and a region in which light passes is hereinafter referred to as "slit" or "slit region." The slit region is sometimes referred to as "opening region" or "light passing region."

In the output state of FIG. 2A wherein a two-dimensional image is displayed, since the overall panel is placed into a white color state, significant reduction of the transmission factor does not occur. On the other hand, in the case of FIG. 2B wherein a three-dimensional image is displayed, the liquid crystal is switched into a line form to form striped parallax barrier regions separated from each other by slits.

It is to be noted that, while a twisted nematic mode wherein the transmission factor is high is desirable as a display mode of the switching liquid crystal layer 46, any other display mode may be applied if changeover between the white and the black can be carried out such as a vertical orientation mode or an in-plane switching mode.

Further, while a simple matrix may be applied as an electrode structure, a monochromatic panel of an active matrix can be used where three-dimensional display is applied only to one portion and also the displaying position is varied.

[Circuit for Image Display]

While operation of stereoscopic image displaying is described using the configuration described above as a premise, a circuit for carrying out control of the operation is described first.

Figure 3:
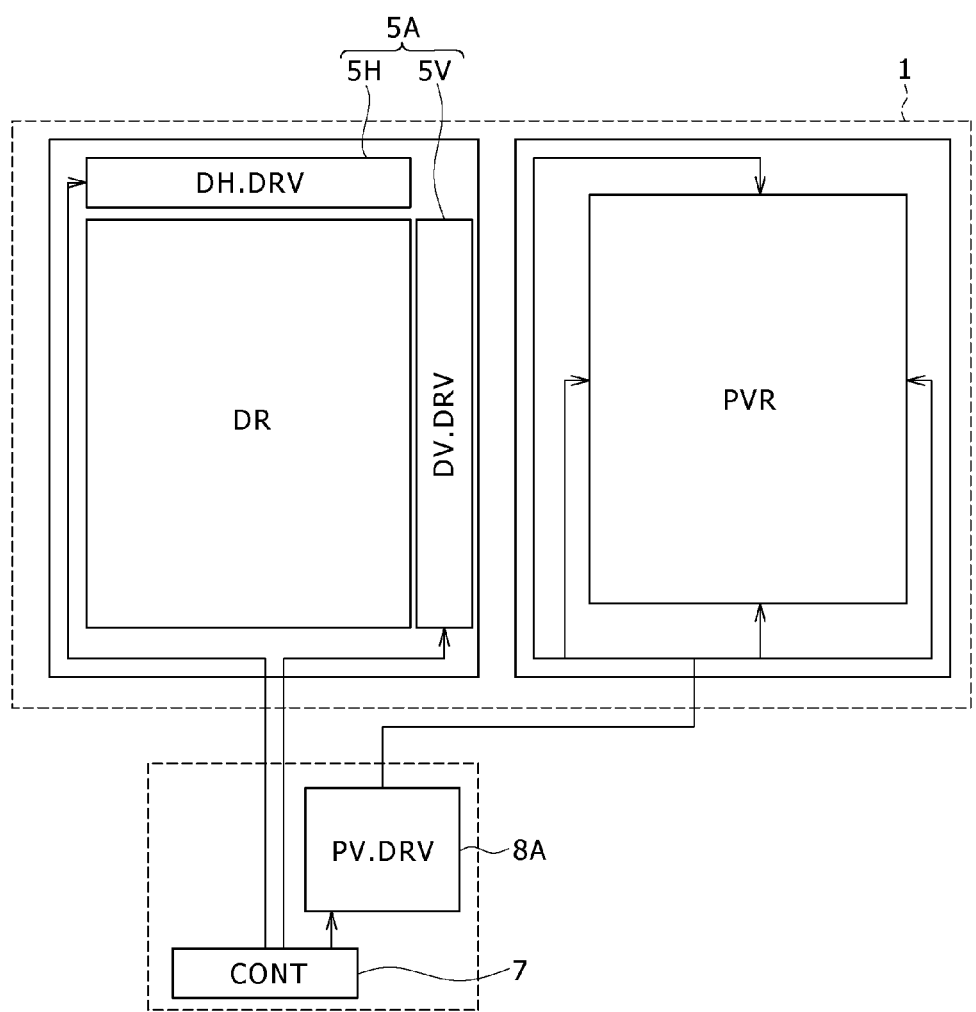
FIG. 3 is a block diagram showing functional blocks of a peripheral circuit of a display region and other control circuits provided in the stereoscopic image displaying apparatus of an embodiment.

FIG. 3 shows functional blocks of peripheral circuits in a display region and control circuits in the other region than the display region provided on a stereoscopic image displaying apparatus according to the present embodiment.

While three top plan views are shown in a juxtaposed relationship in FIG. 3, they illustrate two functional hierarchies other than the backlight 20 in the stereoscopic image displaying apparatus 1.

A display area DR corresponds to the optical modulation panel 51 and a parallax barrier region PVR corresponds to the parallax barrier 43.

As circuits for driving and controlling the two regions or functional hierarchies, a displaying driving circuit 5A formed from a display H driver 5H and a display V driver 5V, a control circuit (CONT) 7 such as a CPU and a parallax barrier driving circuit (PV.DRV) 8A are used. The control circuit 7 and the parallax barrier driving circuit 8A are hereinafter referred to as PV controlling section 8.

Driving of the optical modulation panel 51 is carried out by the displaying driving circuit 5A and PV control is carried out by cooperation of the parallax barrier driving circuit 8A and the control circuit 7.

Referring back to FIGS. 2A and 2B, in the output state of FIG. 2A wherein the PV control is not carried out, in response to supply of an image signal which does not include parallax information to the optical modulation panel 51 in FIGS. 2A and 2B, a two-dimensional image display mode wherein a two-dimensional image is displayed is established. On the other hand, in the output state of FIG. 2B wherein the PV control is carried out, in response to supply of an image signal PS including parallax information and an interaction with liquid crystal switching of light, a three-dimensional image display mode wherein a three-dimensional image having a parallax is generated is established.

The PV controlling section 8 in FIG. 3 can carry out changeover between a two-dimensional image and a three-dimensional image bidirectionally on the overall screen and can carry out the changeover in part of the screen. In particular, a two-dimensional display image can be changed over partly to a three-dimensional image and conversely a three-dimensional image can be changed over partly to a two-dimensional image.

Further, the PV controlling section 8 can rotate the direction in which a parallax is to be generated by 90 degrees in the three-dimensional image display mode. In particular, the PV controlling section 8 changes parallel striped light elongated in a column direction to parallel striped light elongated in a row direction to rotate the parallax appearing direction by 90 degrees. This is because it is intended to make the parallax appearing direction coincide with a spacing direction of the eyes in response to rotation of the direction of visual confirmation of the stereoscopic image displaying apparatus by 90 degrees by the user.

[Stereoscopic Image Displaying Operation]

Figure 4:
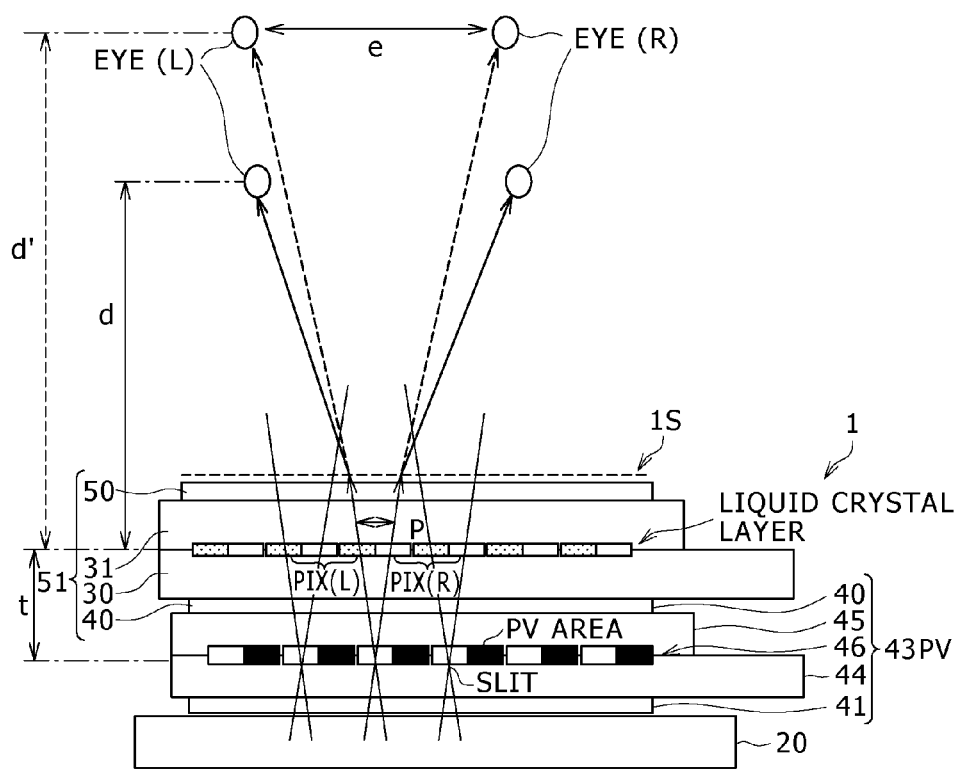
FIG. 4 is a schematic view illustrating conditions for image formation and visual confirmation of a stereoscopic image of an embodiment.

FIG. 4 illustrates a condition for image formation and visual confirmation of a stereoscopic image.

Under the control of the displaying controlling section including the displaying driving circuit 5A and control circuit 7 shown in FIG. 3 based on an inputted image signal, an image for the right eye is displayed on discrete pixels (hereinafter referred to as R pixels PIX(R)) and an image for the left eye is displayed on the other discrete pixels (hereinafter referred to as L pixels PIX(L)). The pitch of pixel units in the parallax appearing direction between an R pixel PIX(R) and an L pixel PIX(L) corresponding to the same picture element is represented by "parallax pixel pitch P" in FIG. 4. In the example of FIG. 4, the parallax pixel pitch P corresponds to the pitch of pixels of the optical modulation panel 51, and the left and right images are repetitively displayed in order of R, L, R, L, . . . for each pixel. Therefore, the resolution is reduced to one half from that of the original image. Light passing through the R pixel PIX(R) and light passing through the L pixel PIX(L) corresponding to the same picture element enter the right eye and the left eye of a viewer, respectively. At this time, to the viewer, an image looks formed at a predetermined distance from the outer face 105.

If the pixel pitch of the optical modulation panel 51 and the pitch of barrier lines formed by the parallax barrier fully coincide with each other, then the parallax is adjusted only at the center of the front. Therefore, the pitch of the parallax barrier is a little greater than the pixel pitch of the optical modulation panel in order to adjust the parallax.

In FIG. 4, the distance from the liquid crystal layer of the optical modulation panel 51 to the liquid crystal layer, that is, the switching liquid crystal layer 46, of the parallax barrier 43 is represented by "t" and the spacing distance between the eyes of a common human is represented by "e." In this instance, reference character "d'" defined by p:t=e:(t+d') represents the position of the eyes where there is no difference between the refraction index of the air and an average refraction index (refraction index of glass is dominant) of the image optical path of the stereoscopic image displaying apparatus 1.

If an optimum position for actual visual confirmation is roughly calculated using a refraction index difference between glass and the air, then the visual confirmation position d of a stereoscopic image can be determined generally by $d \approx d'/1.5$.

Further, while the position of the parallax barrier panel is set between the optical modulation panel and the backlight, the order just described may be reversed. In particular, the backlight, optical modulation panel and parallax barrier panel may be provided in this order.

[Shape of the PV Electrode]

The stereoscopic image displaying apparatus according to the present embodiment is characterized in the shape, or the pattern in a plan view, of the first to fourth electrodes of the parallax barrier. In the following, the shape and working effects provided by the shape are described with reference to the drawings.

Figure 5:
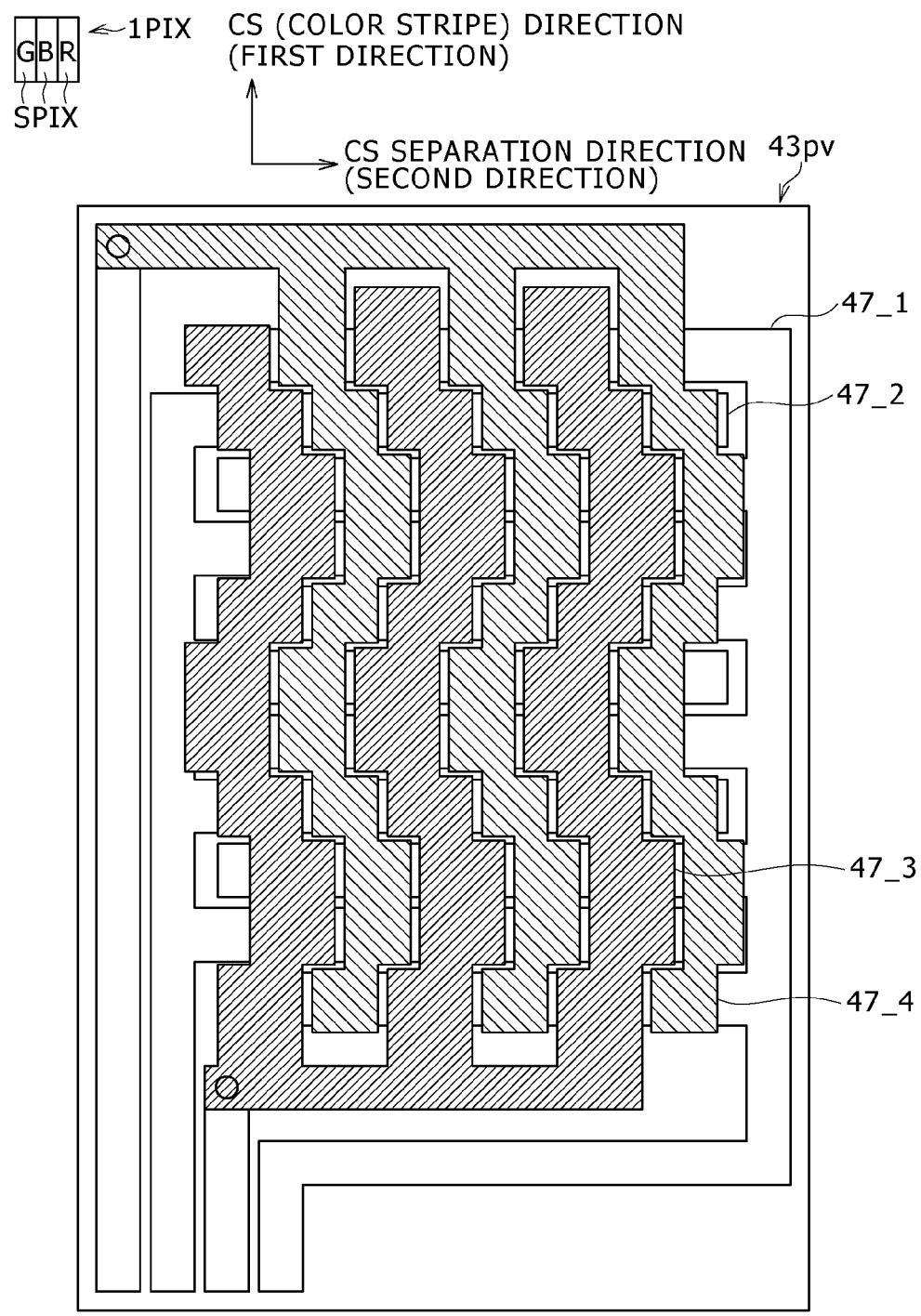
FIG. 5 is a schematic plan view showing an example of a shape of four PV electrodes of a stereoscopic image displaying apparatus according to a first embodiment.

FIG. 5 is a top plan view showing the first and second electrodes formed, for example, on the first PV substrate 44 and the third and fourth electrodes formed, for example, on the second PV substrate 45 of the parallax barrier 43 shown in FIGS. 2A and 2B in an overlapping state with each other.

The plan view of FIG. 5 is illustrated elongated in the vertical direction similarly to that on a portrait screen. The reason why this illustration of FIG. 5 is applied relates to an intention to prevent a situation in the present embodiment that, where a color scheme of parallel stripes is premised, the color balance is lost or damaged when a parallax appears in a transverse direction on portrait screen display. Therefore, all of top plan views of FIG. 5 and so forth are illustrated elongated in the vertical direction similarly to that on a portrait screen.

The color scheme of parallel stripes depends upon a color arrangement of color filters.

More particularly, as shown in the top plan view of FIG. 5, one pixel (PIX) is configured by juxtaposing three vertically elongated subpixels (SPIX) horizontally, and color filters of the different colors are applied to the subpixels (SPIX). Here, while the colors of G, B and R are arranged in order from the left, according to the present application, the color arrangement is not limited to this. Further, a four-color scheme may be applied.

Here, a color stripe direction (hereinafter referred to as CS direction) corresponds to an example of a "first direction" and a separation direction of color stripes orthogonal to the CS direction (hereinafter referred to as CS separation direction) corresponds to an example of a "second direction."

As shown in FIG. 5, four PV electrodes including a first electrode 47_1, a second electrode 47_2, a third electrode 47_3 and a fourth electrode 47_4 are disposed on the parallax barrier 43. Since the four electrodes are formed individually from a transparent electrode material such as, for example, ITO, the light transmittance of the electrodes themselves is high.

The first electrode 47_1 and the second electrode 47_2 are elongated in the CS separation direction and have a predetermined number of electrode portions disposed alternately in the CS direction. Although the number of such electrode portions in FIG. 5 is six, it actually is a greater number. The electrode portions of the first electrodes 47_1 and the second electrodes 47_2 are individually connected commonly by a connecting portion and patterned from the same electrode material, and the connecting portions extend to the lower edge in FIG. 5 side of the parallax barrier 43.

A positive voltage such as, for example, 5 V is applied to one of the first electrode 47_1 and the second electrode 47_2, and the other one of the electrodes 47_1 and 47_2 is grounded to 0 V. At this time, also the third electrode 47_3 and the fourth electrode 47_4 are grounded to 0 V. The application of the bias voltages is carried out by the parallax barrier driving circuit 8A shown in FIG. 3. The parallax barrier driving circuit 8A may be formed on one of the PV boards of the parallax barrier 43, for example, on the first PV substrate 44, or may be disposed on the outside.

By the bias voltage application, black display is carried out only in a region in which the voltage of 5 V is applied in a layer thicknesswise direction to the switching liquid crystal layer 46 shown in FIG. 2 so that a parallax barrier is formed. Since the parallax barrier is formed corresponding to the electrode pattern of the first electrode 47_1 or the second electrode 47_2, control for the landscape display mode wherein the parallax direction is orthogonal to the CS direction is carried out. The state just described is hereinafter referred to as "first parallel state of the parallax barrier."

On the other hand, the planar patterns of the third electrode 47_3 and the fourth electrode 47_4 individually have a zigzag shape. The zigzag shape is a form of a "shape including a plurality of rectangular portions displaced in a direction orthogonal to a longitudinal direction."

In particular, the third electrode 47_3 and the fourth electrode 47_4 individually have a plurality of, three in FIG. 5, electrode portions each having a shape configured from a set of plural, eight in FIG. 5, rectangular portions individually having a length in the CS direction and a width in the CS separation direction. In each electrode portion, the individual rectangular portions are disposed such that each thereof is displaced in the CS separation direction from those rectangular portions which are positioned adjacent thereto in the CS direction, and generally form a meandering line whose longitudinal direction coincides with the CS direction.

The meandering line is formed so as to satisfy a condition that "each of the electrode portions of the electrodes 47_3 and 47_4 is elongated in the CS direction and has a shape which includes alternate repetitions in one and the other of the color stripe separation direction of N shifts or displacements ($N \geq 1$) of the rectangular portions."

In the arrangement of FIG. 5, for example, each of the electrode portions of the third electrode 47_3 has large rectangular portions and small rectangular portions connected and disposed alternately in the CS direction. In other words, it is considered that, in each electrode portion of the third electrode 47_3, the large rectangular portions and the small rectangular portions are arranged so as to exhibit alternate repetitions of two displacements or shifts in the negative direction of the CS separation direction and two displacements or shifts in the positive direction.

This similarly applies also to the fourth electrode 47_4.

FIG. 6A illustrates a relationship between a parallax barrier formed on the PV switching liquid crystal layer by applying a positive voltage such as, for example, 5 V and arrangement of pixels and color filters.

Referring to FIG. 6A, parallax barrier regions 46*pv* formed on the switching liquid crystal layer 46 correspond to black display regions and a top plan view of the black display regions has a substantially same shape as that of the electrode portions of the third electrode 47_3 shown in FIG. 5.

As recognized from the description just above, in the third electrode 47_3 shown in FIG. 5, the size of the large rectangular portions is equal to that of two pixels (PIX) and the size of the small rectangular portions is equal to that of one pixel (PIX).

Further, a region between two arbitrary ones of the optional parallax barrier regions 46*pv* which are positioned nearest to each other, that is, a slit region which is a light transmission region or opening region, corresponds to a white display region, and the shape of the white display region is substantially same as that of the parallax barrier regions 46*pv*.

As recognized from the description just above, the electrode portions of the fourth electrode 47_4 of FIG. 5 and inter-electrode spaces on both sides in the widthwise direction of the electrode portions of the fourth electrode 47_4 function as white display regions. Accordingly, the width of the electrode portions of the fourth electrode 47_4 has to be set smaller than that of the third electrode 47_3.

The four PV electrodes from the first electrode 47_1 to the fourth electrode 47_4 described above are individually formed from a transparent electrode material having a high light transmittance such as, for example, an ITO film.

In the landscape display mode, a positive voltage is applied to one of the first electrode 47_1 and the second electrode 47_2 using a potential of the other one of the electrodes 47_1 and 47_2 as a reference. In the portrait display mode, a positive voltage is applied to a wider one of the third electrode 47_3 and the fourth electrode 47_4, here to the third electrode 47_3, using a potential of the narrower one of the electrodes 47_3 and 47_4 as a reference.

Further, when a two-dimensional image is to be displayed, the voltage is set such that light is transmitted over the overall area. For example, for the total transmission, all of the electrodes are grounded.

Therefore, although the twisted nematic mode of a normally white mode is desirable as a liquid crystal mode because it has a high transmittance, also the in-plane switching mode or the vertical orientation mode can be applied.

It is to be noted that the voltage application described above is carried out by the parallax barrier driving circuit 8A shown in FIG. 3 under the control of the control circuit 7.

Figure 7:
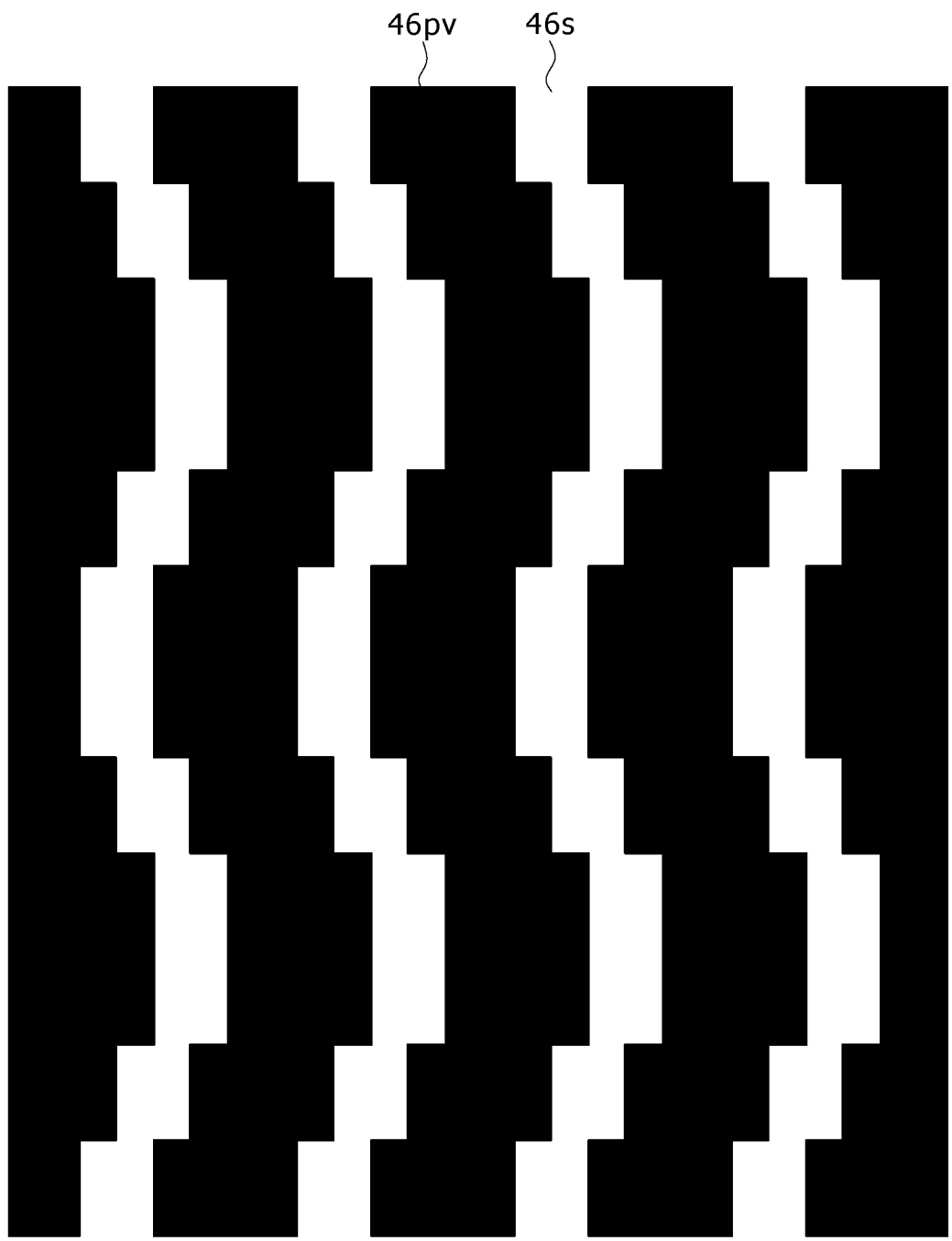
FIG. 7 is a schematic plan view showing parallax barrier regions which are black displaying regions and slit regions which are white displaying regions upon PV control in the portrait mode in the stereoscopic image displaying apparatus of the first embodiment.

FIG. 7 shows the parallax barrier regions 46*pv* which are black display regions and the slit region 46*s* which are white display regions when a voltage of the portrait specifications is applied to the parallax barrier. Meanwhile, FIG. 8 shows the parallax barrier regions 46*pv* which are black display regions and the slit region 46*s* which are white display regions when a voltage of the landscape specifications is applied.

In the stereoscopic image displaying apparatus according to the present embodiment, a parallax barrier having a normal parallel straight shape is formed in the landscape mode, but a parallax barrier having a zigzag shape is formed in the portrait mode.

Figure 8:
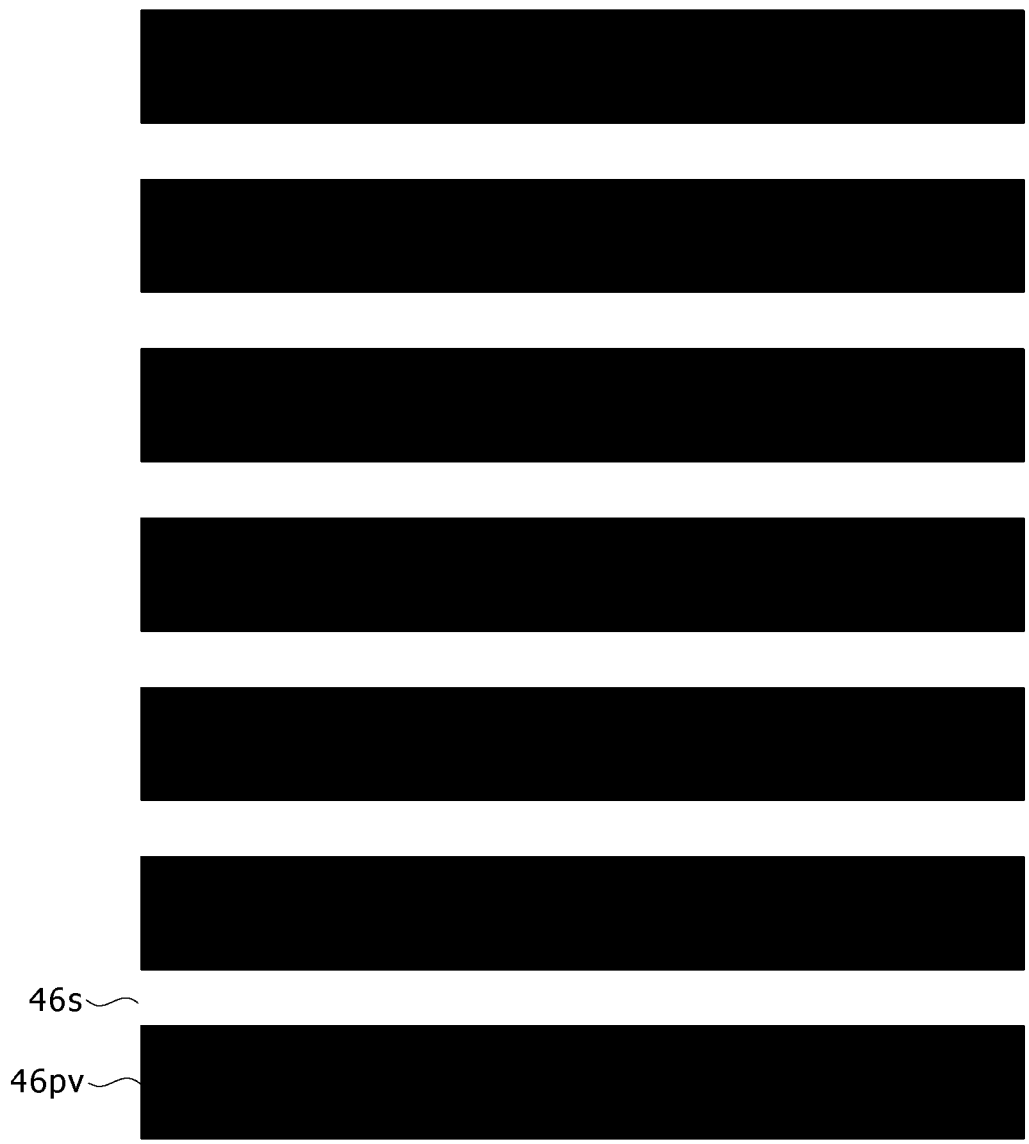
FIG. 8 is a plan view showing parallax barrier regions or black displaying regions and slit regions or white displaying regions upon PV control in the landscape mode in the stereoscopic image displaying apparatus of the first embodiment.

While light leakage between electrodes is not shown in the parallax barrier shape in FIGS. 7 and 8, where the stereoscopic image displaying apparatus is driven in a normally black mode, the parallax barrier is placed in such a display mode as shown in FIG. 7 or 8. Where the stereoscopic image displaying apparatus is driven in the normally white mode, actually the liquid crystal is not switched and light leakage appears at a location at which a voltage is not applied between stripes.

In the present embodiment, more preferably an overlap between such a third electrode 47_3 or parallax barrier regions 46*pv* as shown in FIG. 6A and a color scheme pattern is applied.

Light from pixels which enters the left (L) and right (R) eyes when the color arrangement and the parallax barrier region overlap with each other as seen in FIG. 6A is shown in FIG. 6B.

As seen in FIGS. 6A and 6B, the parallax barrier regions 46*pv* have a folded back shape such that, in light from pixels which passes the space between the parallax barrier regions and enter the eyes, the pixel of each of the colors of R, G and B is placed at the center of each three lines. Therefore, the rates of the colors (for the left and right eyes) upon 3D display can be uniformized (or got closer). Further, as regards an image, if the same image is displayed for each three pixels to decrease the vertical resolution to ⅓, then the colors can be distributed uniformly to the image. By this, a good three-dimensional image can be produced.

Figures 9A, 9B:
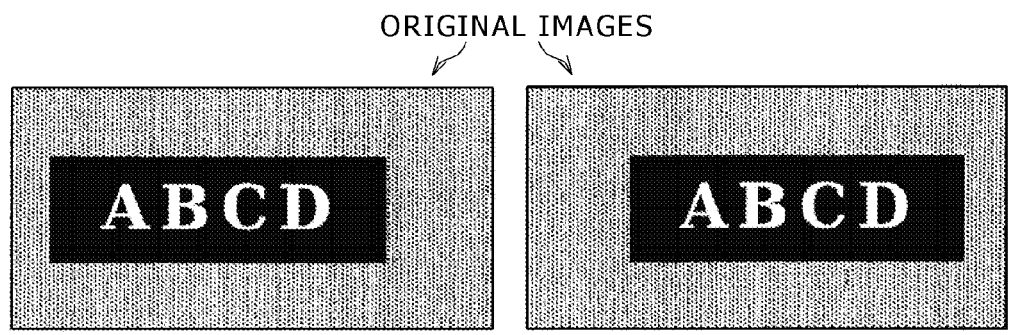
FIGS. 9A, 9B and 9C are schematic views showing an example of images for stereoscopic image display.
Figure 9C:
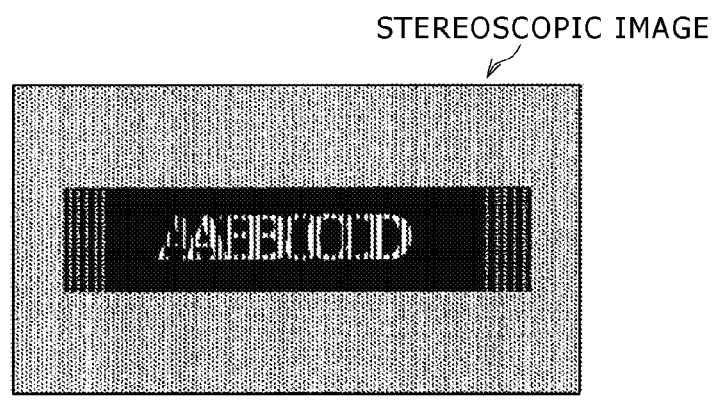

FIGS. 9A to 9C show different examples of an image for stereoscopic image display.

Two two-dimensional images are produced for applications for the left and the right as shown in FIGS. 9A and 9B, respectively, and the left and right two-dimensional images are overlapped alternately for every other to produce a spatially divided image signal. The spatially divided image signal is applied to the optical modulation panel 51 shown in FIG. 1. Parallax information which indicates a spatial displacement between images upon superposition is included in the image signal. The optical modulation panel 51 and the displaying controlling section which includes the displaying driving circuit 5A and the control circuit 7 shown in FIG. 3 detect parallax information, for example, from the optical modulation panel 51 and carry out control suitable for the parallax information using the parallax barrier 43. Consequently, an image shown in FIG. 9C synthesized from the two two-dimensional images is formed as a stereoscopic image on the panel displaying face side.

Confirmation of a color balance was carried out with the stereoscopic image shown in FIG. 9C.

It was successfully confirmed that a good stereoscopic display image having no tint is obtained in both of the landscape display mode and the portrait display mode and the zigzag shape of the PV electrodes is effective for color balance improvement.

Comparative Example 1

Figure 10:
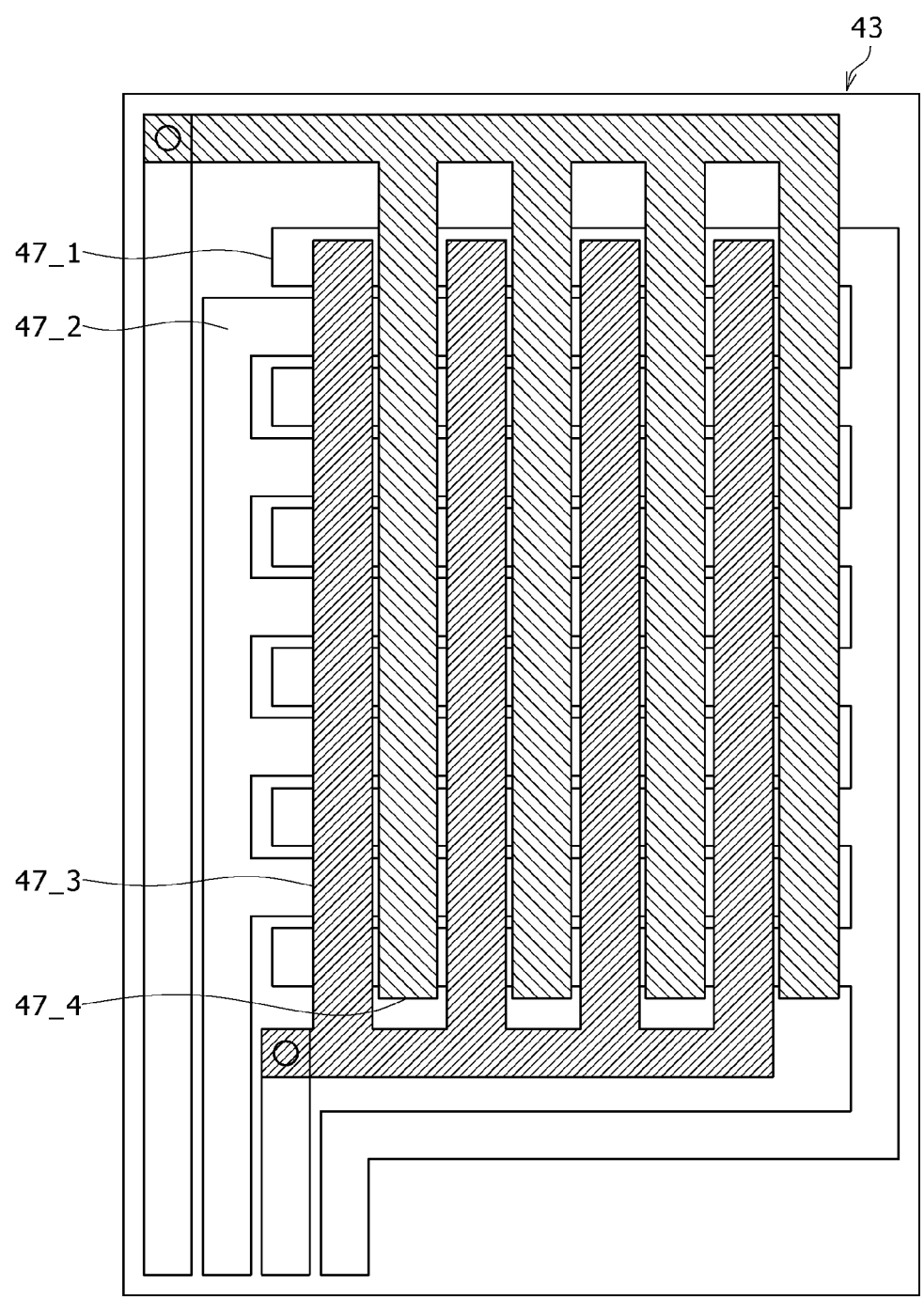
FIG. 10 is a schematic plan view showing an example of a shape of four PV electrodes of a stereoscopic image displaying apparatus according to a comparative example.

FIG. 10 shows a comparative example wherein a PV electrode arrangement in the form of parallel stripes is applied to both of the first electrode 47_1 and the second electrode 47_2 for the landscape display mode and the third electrode 47_3 and the fourth electrode 47_4 for the portrait display mode.

The parallax barrier 43 in the comparative example was used to display a stereoscopic image similar to that shown in FIG. 9 to carry out confirmation of the color balance.

It was recognized that, although there is no problem in the landscape display mode, some tint appears on a stereoscopic image and degrades the display quality. Consequently, it was proved that the electrode shape according to the first embodiment is effective for color balance improvement in the portrait display mode.

2. Second Embodiment

Figure 11:
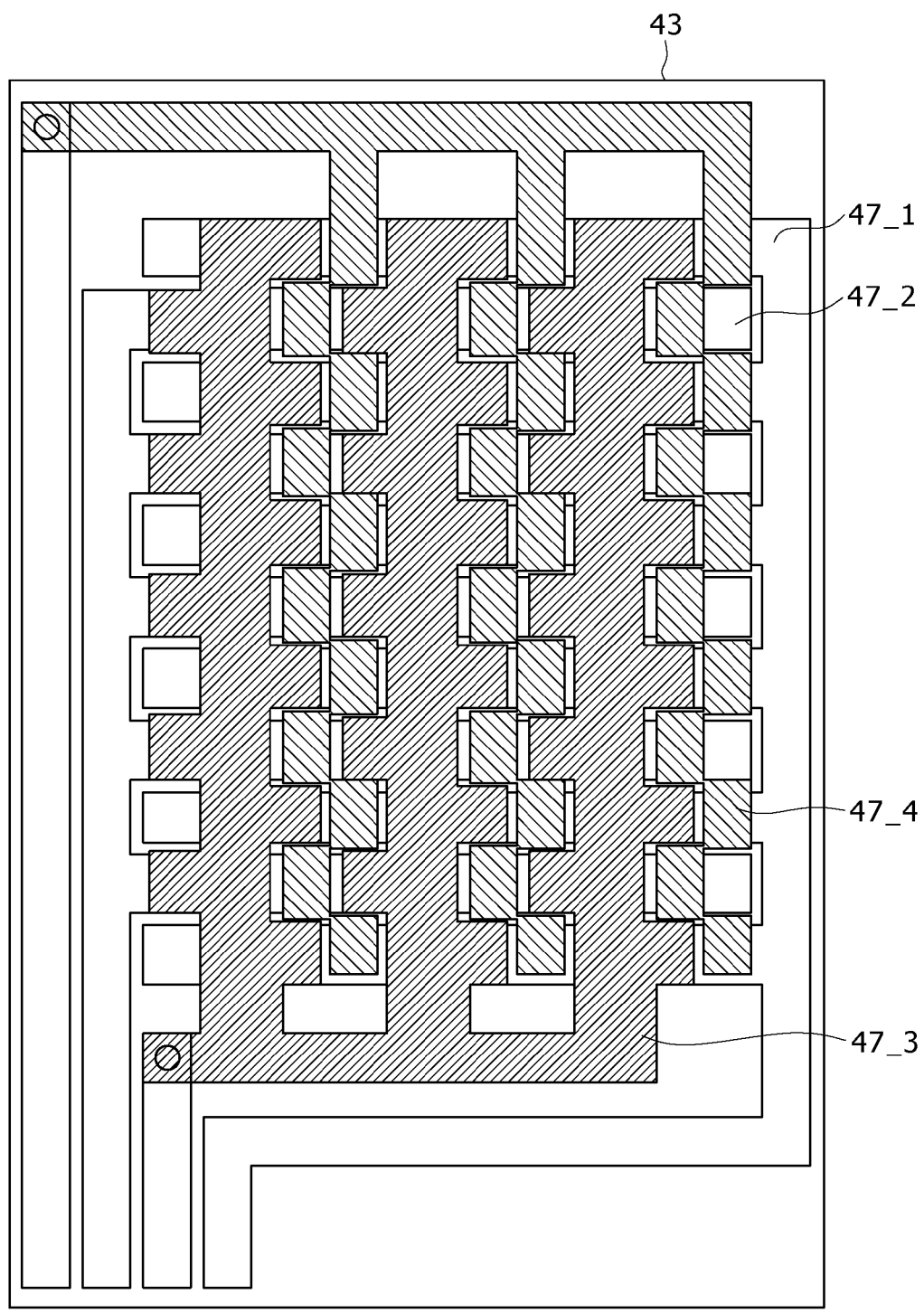
FIG. 11 is a schematic plan view showing an example of a shape of four PV electrodes of a stereoscopic image displaying apparatus according to a second embodiment.

FIG. 11 shows an example of the shape of the four PV electrodes of a stereoscopic image displaying apparatus according to a second embodiment.

As shown in FIG. 11, similarly as in the first embodiment, the PV electrodes for the landscape display mode, that is, the first electrode 47_1 and the second electrode 47_2, are disposed in the form of parallel stripes. On the other hand, at least one of the PV electrodes for the portrait display mode, that is, at least one of the third electrode 47_3 and the fourth electrode 47_4, has a meandering shape in a unit of two pixels. It is to be noted that the third electrode 47_3 has a shape wherein each electrode portion thereof has a straight central portion and convex portions alternately provided on the left and right side of the straight central portion. While such a shape as just described is not commonly called meandering shape, at least the fourth electrode 47_4 has a zigzag shape. A zigzag shape wherein a rectangular portion is shifted alternately is common also to both of the third and fourth electrodes 47_3 and 47_4.

Figure 12:
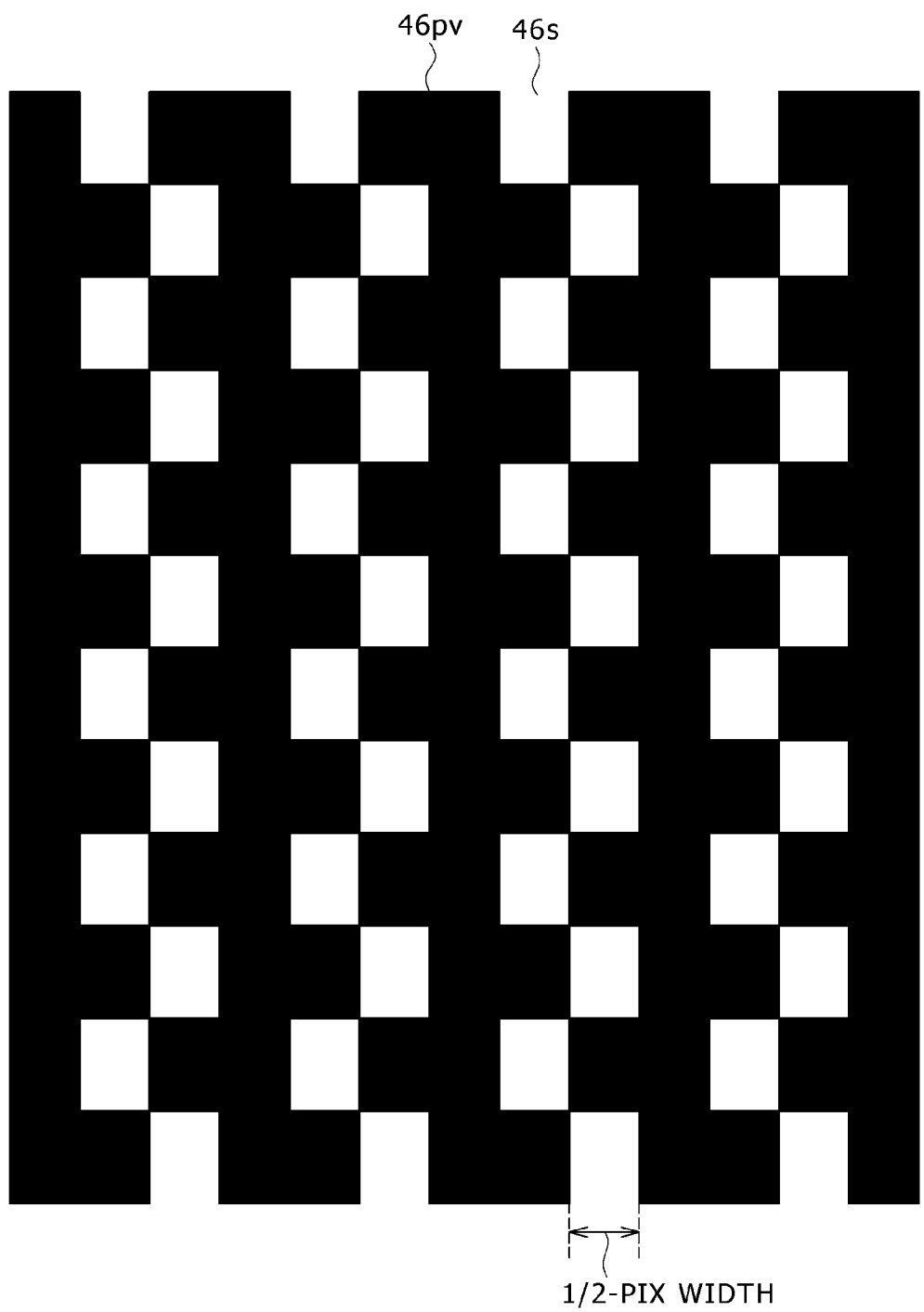
FIG. 12 is a schematic plan view showing parallax barrier regions which are black displaying regions and slit regions which are white displaying regions upon PV control in the portrait mode in the stereoscopic image displaying apparatus of the second embodiment.

FIG. 12 shows the parallax barrier regions 46*pv* which are black display regions and the slit regions 46*s* which are white display regions when a voltage of portrait specifications is applied to the parallax barrier.

As shown in FIG. 12, the width of an opening region corresponds to a width corresponding to one color and one half of a color, that is, a ½ pixel width. In each slit region 46*s*, rectangular opening regions are disposed alternately in a check pattern to determine the shape of the slit region 46*s*. The shape corresponds to a shape wherein one shift of the rectangular portions is alternately repeated in the opposite directions. It is to be noted that, while the width of a connection portion between the rectangular portions is very small, since the slit region 46*s* is driven by 0 V application, as far as wire breaking does not occur at the connection portion, there is no problem even if the resistance thereat is high.

FIG. 13A shows a relationship between the parallax barrier formed on the PV switching liquid crystal layer by applying a positive voltage such as, for example, 5 V and the arrangement of pixels and color filters. Further, FIG. 13B shows a color scheme of light from pixels which enters the left (L) and right (R) eyes when the color arrangement and the parallax barrier regions overlap with each other as seen in FIG. 13A.

As shown in FIG. 13A, the width of the electrode portions of the third electrode 47_3 which define the black displaying regions corresponds to a 3/2-pixel width. Meanwhile, the width of the electrode regions of the fourth electrode 47_4 not shown in FIG. 13A which define the white displaying regions corresponds to a ½-pixel width. However, actually since insulating regions for isolating the electrodes from each other are provided, the widths of the third electrode 47_3 and the fourth electrode 47_4 are somewhat smaller than 3/2-pixel and ½-pixel widths, respectively.

As shown in FIG. 13B, in the present case, one 3D pixel is formed for each two pixels arranged vertically. One pixel is formed from two subpixels including blue (B) and red (R) subpixels and two one-half subpixels of green (G). Consequently, color balance can be achieved. Further, since, as regards an image, the resolution in the horizontal direction in 3D display is ½ and the resolution in the vertical direction is ½ by the structure described above, balance of the resolution is established and the display quality is good.

3. Third Embodiment

Figure 14:
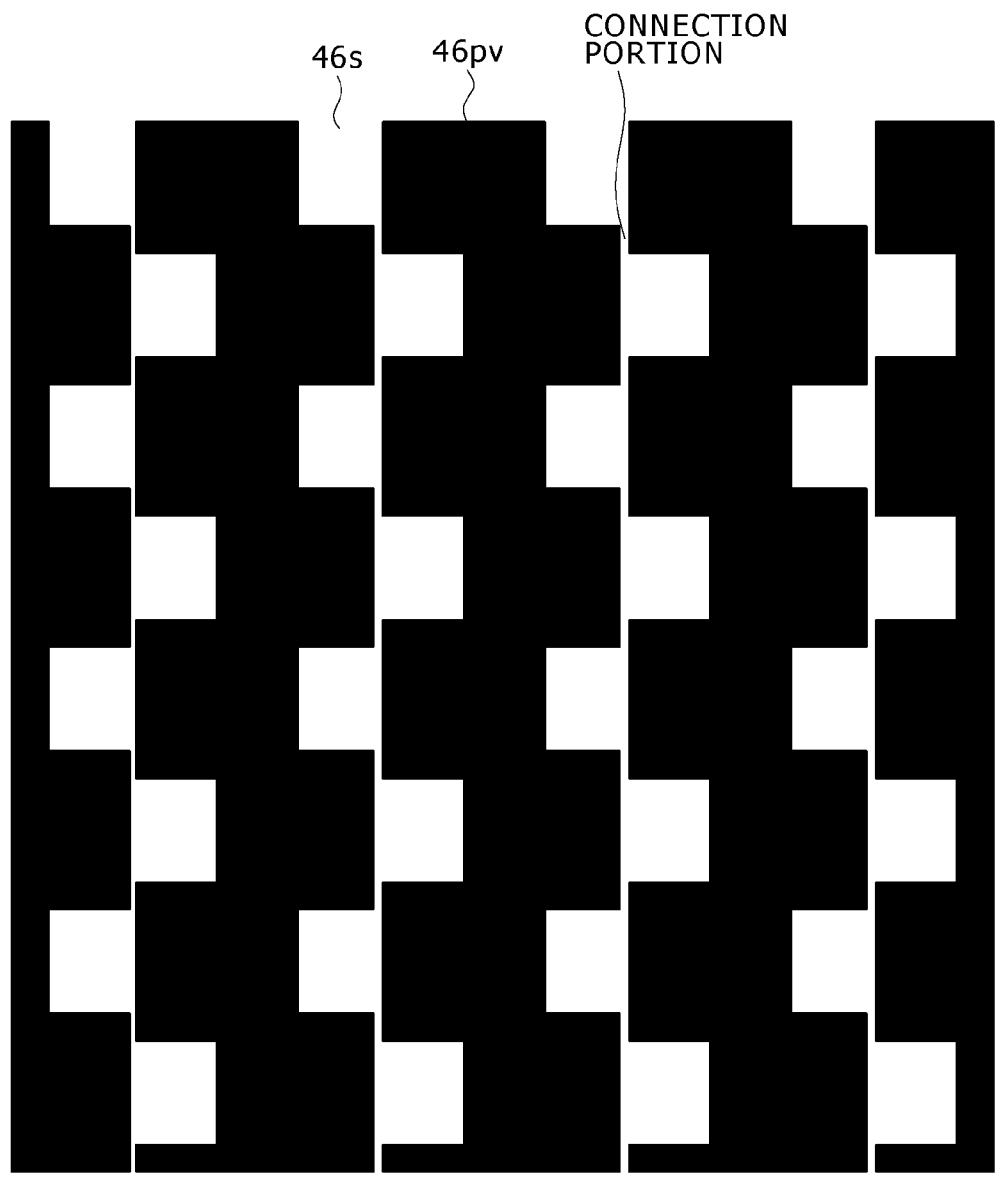
FIG. 14 is a plan view showing parallax barrier regions which are black displaying regions and slit regions which are white displaying regions upon PV control in the portrait mode in a stereoscopic image displaying apparatus according to a third embodiment.

FIG. 14 shows a PV pattern of a stereoscopic image displaying apparatus according to a third embodiment. More particularly, FIG. 14 corresponds to a case wherein the electrode shape shown in FIG. 12 according to the second embodiment is subject to minor change. In particular, in the present embodiment, some length is provided to a connection portion between rectangular portions of the fourth electrode 47_4 shown in FIG. 11.

In the slit regions 46s shown in FIG. 14 which are obtained by the minor change, each connection portion has a length corresponding to a 0.2-pixel size and the length of an opening region, which corresponds to a rectangular electrode portion, corresponds to a 0.8-pixel size.

While the opening ratio of the PV opening region in FIG. 14 is lower than that in FIG. 12, the PV opening region has an advantage that interference is less likely to occur between the R pixel PIX(R) and the L pixel PIX(L). As a result, a good 3D display characteristic that, even if the field of view is changed to the vertical direction in comparison with that in the second embodiment, a three-dimensional image can be viewed with a wider field of view is obtained.

While an overlap between the color scheme and the electrodes regarding the third embodiment is not shown, similarly as in the second embodiment, one 3D pixel is formed for each two pixels arranged vertically. At this time, similarly as in the second embodiment, since one pixel is formed from two subpixels including a blue subpixel and a red subpixel and two one-half green subpixels, color balance is achieved. Further, it is similar as in the second embodiment that, since the resolution in the horizontal direction is ½ in 3D display and the resolution in the vertical direction is ½ by the structure described above, balance of the resolution is established and the display quality is good.

Similarly as in the second embodiment, the display panel is configured so as to have a zigzag structure in a unit of two pixels to carry out display, and the center of a white portion of the barrier panel is disposed halfway between the R and L pixels when the panel center is viewed from just above.

When a three-dimensional image was displayed actually, it was confirmed that good display having no tint is obtained in the portrait mode and, even if the field of view is changed to the vertical direction in comparison with the second embodiment, the three-dimensional image can be viewed in a wider field of view.

4. Fourth Embodiment

Figure 15:
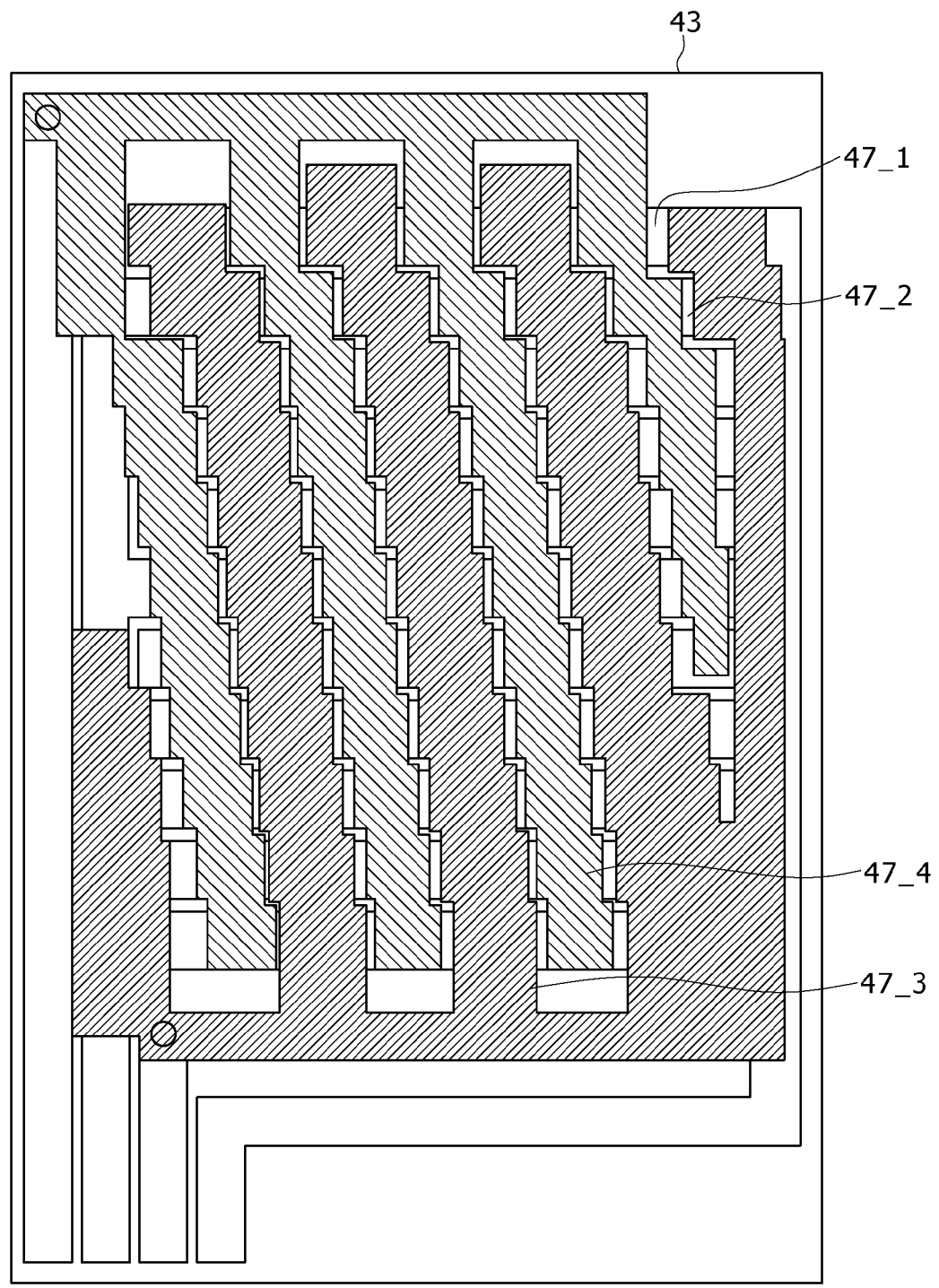
FIG. 15 is a schematic plan view showing an example of a shape of four PV electrodes of a stereoscopic image displaying apparatus according to a fourth embodiment.

FIG. 15 shows an example of the shape of the four PV electrodes of a stereoscopic image displaying apparatus according to a fourth embodiment.

Referring to FIG. 15, similarly as in the first to third embodiments, the PV electrodes for the landscape display mode including the first electrode 47_1 and the second electrode 47_2 are disposed in parallel stripes. On the other hand, both of the PV electrodes for the portrait display mode including the third electrode 47_3 and the fourth electrode 47_4 individually have a zigzag shape having an oblique arrangement direction.

More particularly, while a shift structure of the rectangular portions displaced obliquely for every pixel of one color is the basic structure similarly as in the first embodiment, the stereoscopic image displaying apparatus according to the present embodiment has a shape wherein the rectangular portions is shifted only in one direction without folding back the direction of the shift in the CS separation direction different from the first embodiment.

FIG. 16A illustrates a relationship between the parallax barrier formed on the PV switching liquid crystal layer by applying a positive voltage such as, for example, 5 V and the arrangement of pixels and color filters. Meanwhile, FIG. 16B shows a color scheme of light from pixels which enters the left (L) and right (R) eyes when the color arrangement and the parallax barrier regions overlap with each other as seen in FIG. 16A.

In FIG. 15, the electrode portions of the first electrode 47_1 have a 4/3-pixel width and the electrode portions of the second electrode 47_2 have a ⅔-pixel width. However, the pixel widths may be set in such a manner as seen in FIGS. 16A and 16B.

More particularly, the width of the electrode portions of the third electrode 47_3 which define the black displaying regions corresponds to a one-pixel width as seen in FIG. 16A. Also the width of the electrode portions of the fourth electrode 47_4 not shown in FIG. 16A which define the white displaying regions corresponds to a one-pixel width. However, actually since insulating regions for isolating the electrodes from each other are provided, the widths of the electrode portions of the third electrode 47_3 and the fourth electrode 47_4 are individually somewhat smaller than one pixel.

As seen in FIG. 16B, in the arrangement illustrated, one 3D pixel is formed for each three pixels arranged vertically. One pixel is formed from subpixels including three subpixels, that is, a blue (B) pixel, a red (R) pixel and a green (G) pixel, and totaling six one-half pixels including two pixels for each color. Consequently, the color balance is achieved. Further, since, as regards an image, the resolution in the horizontal direction is ⅓ in 3D display and the resolution in the vertical direction is ½ by the structure described above, balance of the resolution is achieved and the display quality is good.

Figure 17:
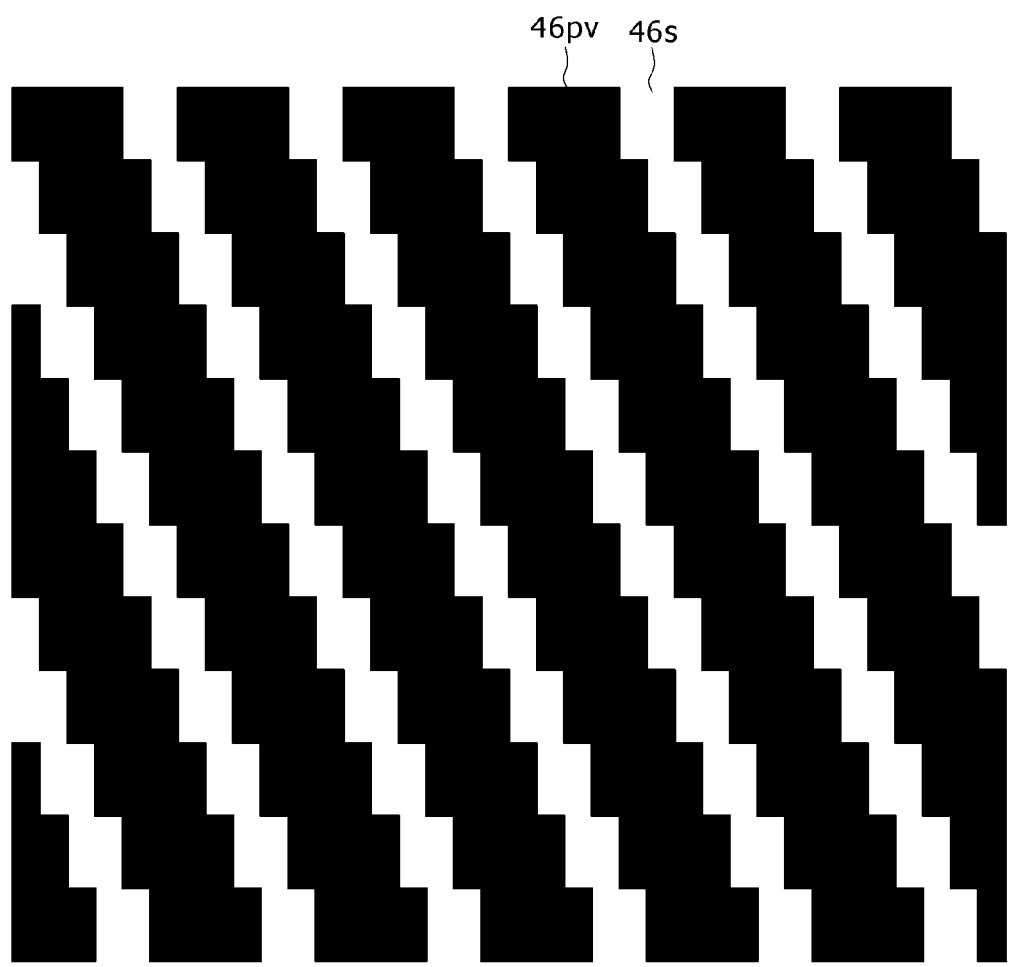
FIG. 17 is a plan view showing parallax barrier regions which are black displaying regions and slit regions which are white displaying regions upon PV control in the portrait mode in the stereoscopic image displaying apparatus of the fourth embodiment.

FIG. 17 shows the parallax barrier regions 46pv which are black displaying regions and the slit regions 46s which are white displaying regions when a voltage of portrait specifications is applied to the parallax barrier. It is to be noted that FIG. 17 corresponds to the case shown in FIG. 15 wherein the third and fourth electrodes are included and illustrates the black displaying regions corresponding to a 4/3-pixel width and the white displaying regions corresponding to a 2/3-pixel width.

The reason why one pixel is set obliquely with three lines as seen in FIG. 16B is that it is intended to place the width center of each slit region 46s of the parallax barrier halfway between the R pixel PIX(R) and the L pixel PIX(L) when the shape of the pixels is made correspond to the oblique shape of the slit regions 46s shown in FIG. 17.

Where a three-dimensional image was displayed actually, a good displaying characteristic having no tint was obtained in the portrait mode similarly as in the first embodiment.

5. Modification 1

In the first to fourth embodiments described above, the color filters are not limited to those of the parallel stripe color arrangement.

In the parallel stripe color arrangement, the electrodes can be disposed in the form of parallel stripes on the first and second electrodes or the third and fourth electrodes. On the other hand, there is the possibility that, in color arrangement other than the parallel stripe color arrangement, arrangement of the electrodes in the form of parallel stripes cannot be applied to any of the first and second electrodes and the third and fourth electrodes. In particular, there is a case wherein, if the parallel stripe arrangement is applied to any one of the first and second electrodes and the third and fourth electrodes, color balance is lost in the slits and tint of a specific color is applied to an overall screen image.

The present application can be applied widely also to such a case as described above, and the zigzag electrode shape in the first to fourth embodiments described hereinabove can be applied at least to the first and second electrodes or the third and fourth electrodes.

6. Modification 2

In the parallel stripe color arrangement, the color scheme pattern of the third electrode 47_3 or the fourth electrode 47_4 is not limited to those of FIG. 6 and so forth but only satisfies at least one of several conditions described below.

In particular, it is a first condition that the shift amount of the third electrode 47_3, that is, the displacement amount in the CS separation direction of the third electrode 47_3, corresponds to the width of subpixels (SPIX) as seen in FIGS. 6A and 6B, preferably coincides with the width of subpixels (SPIX).

It is a second condition that, where the number of colors in a pixel PIX is represented by M, the number of times by which the rectangular portions successively shift in the positive or negative direction of the CS separation direction is equal to a natural number of times of M−1, and preferably, such shifts are repeated alternately changing the direction of such successive shifts the number of which is equal to a natural number of times of the color number M.

Since M=3 is applied in the example of FIGS. 5, 6A and 6B, two shifts, that is, two times of shifting, are repeated alternately. However, the rectangular portions may be shifted, for example, by a number of times equal to a multiple of 2 such as four times of shifting or six times of shifting.

It is a third condition that the width of each of the third electrode 47_3 and the fourth electrode 47_4 in the CS separation direction is preferably greater than the width of a subpixel SPIX but smaller than the width of three subpixels. As seen in FIGS. 6A and 6B, since, in the example shown, the third electrode 47_3 has a maximum width corresponding to one pixel and the inter-electrode distance is substantially equal to a 1/6-pixel width, the width of the fourth electrode 47_4 is substantially equal to a 2/3-pixel width. The reason why the condition that the width of the third electrode 47_3 and the fourth electrode 47_4 in the CS separation direction is "greater than a 1/3-pixel width but smaller than a one-pixel width" is provided is that it is intended that the electrode width should not be restricted to that of FIGS. 5, 6A and 6B.

It is a fourth condition that the width of the third electrode 47_3 corresponds to the width of one pixel PIX and the width of the fourth electrode 47_4 is smaller than the width of one pixel PIX by an amount equal to two inter-electrode distances.

In the example of FIGS. 6A and 6B, the inter-electrode distance is approximately equal to a 1/6-pixel width, and the width of the fourth electrode 47_4 is smaller than that of the third electrode 47_3 by an amount equal to two such inter-electrode distances. Therefore, the fourth electrode 47_4 is disposed so as to correspond to subpixels SPIX for two colors taking the angle of view into consideration.

It is a fifth condition that the boundary between the R pixel PIX(R) and the L pixel PIX(L) is positioned at the center of the spacing width between two arbitrary ones of the electrode portions of the third electrode 47_3 positioned nearest to each other.

7. Fifth Embodiment

Figure 18:
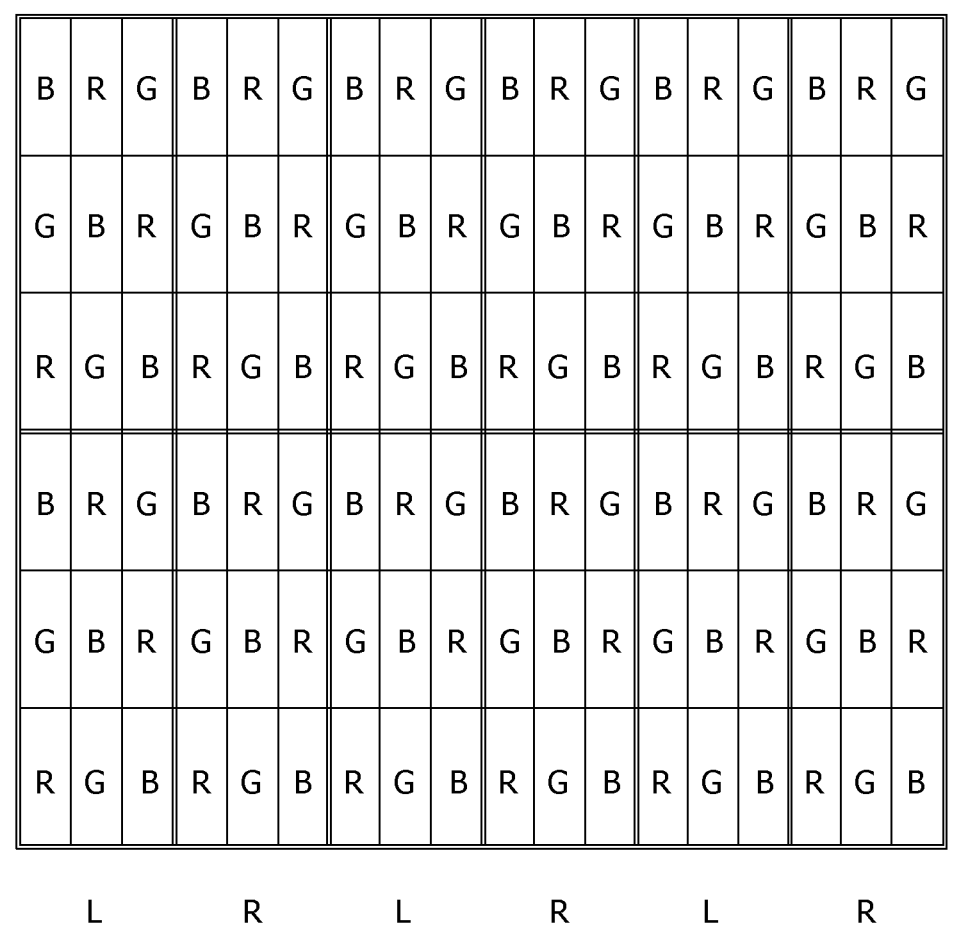

FIG. 18 is a schematic plan view of color arrangement of color filters according to a fifth embodiment. It is to be noted that, in the present embodiment, the parallax barrier 43 has an electrode structure similar to that of the comparative example described hereinabove with reference to FIG. 10.

Referring to FIG. 18, the color filters in the present embodiment have a structure wherein the three colors of R, G and B are repeated not only in the horizontal direction but also in the vertical direction in FIG. 18. Therefore, the color filters in the present embodiment are free from the concept of "color stripes (CS)," different from the first to fourth embodiments. Further, since the countermeasure against tinting is taken on the color filters side, the electrodes have a straight electrode structure in both of the landscape mode and the portrait mode like the electrode structure of the parallax barrier 43 described hereinabove with referenced to FIG. 10.

FIG. 19A shows overlapping arrangement of parallax barrier regions 46pv and the color filters in the portrait mode. Meanwhile, FIG. 19B shows color arrangement of light from pixels entering the left (L) and right (R) eyes when the color arrangement and the parallax barrier regions overlap with each other as seen in FIG. 19A.

As seen in FIG. 19A, in the vertical direction in the portrait mode, three pixels form one set, and in the horizontal direction, two pixels for the left and the right form one 3D pixel. As seen in FIG. 19B, those color filters viewed by the left and right eyes are uniform (or got closer) among the three colors, and even if a viewing angle is changed, the rates of the colors are equal. Consequently, a good 3D image free from a tint can be obtained.

FIG. 20A illustrates overlapping arrangement of parallax barrier regions 46pv and the color filters in the landscape mode. Meanwhile, FIG. 20B shows color arrangement of light from pixels entering the left (L) and right (R) eyes when the color arrangement and the parallax barrier regions overlap with each other as seen in FIG. 20A.

As seen in FIG. 20A, in the landscape mode, the three colors are included uniformly in one pixel in the vertical direction, and therefore, one pixel can be used as it is as one 3D pixel. Also with regard to the color, although the colors are re-arranged, the three colors are distributed uniformly to light from pixels introduced to the eyes similarly as in the other embodiments described hereinabove. Therefore, the display image is free from tinting.

The present fifth embodiment exhibits the following advantage in comparison with the first to fourth embodiments described hereinabove.

In particular, in the fifth embodiment, the color arrangement of the color filters is determined so that no tint appears even if the electrode portions of the parallax barrier are formed straight. Therefore, the viewing angle upon display in the portrait mode is good. For example, in such arrangement as in the first embodiment, since the electrode portions of the parallax barrier are formed obliquely, when the viewing angle is deflected upwardly or downwardly, it is influenced by the zigzag shape of the parallax barrier. In contrast, in the fifth embodiment, since the electrode portions of the parallax barrier are formed straight, even if the viewing angle is deflected upwardly or downwardly, good 3D display can be achieved.

8. Sixth Embodiment

Figure 21:
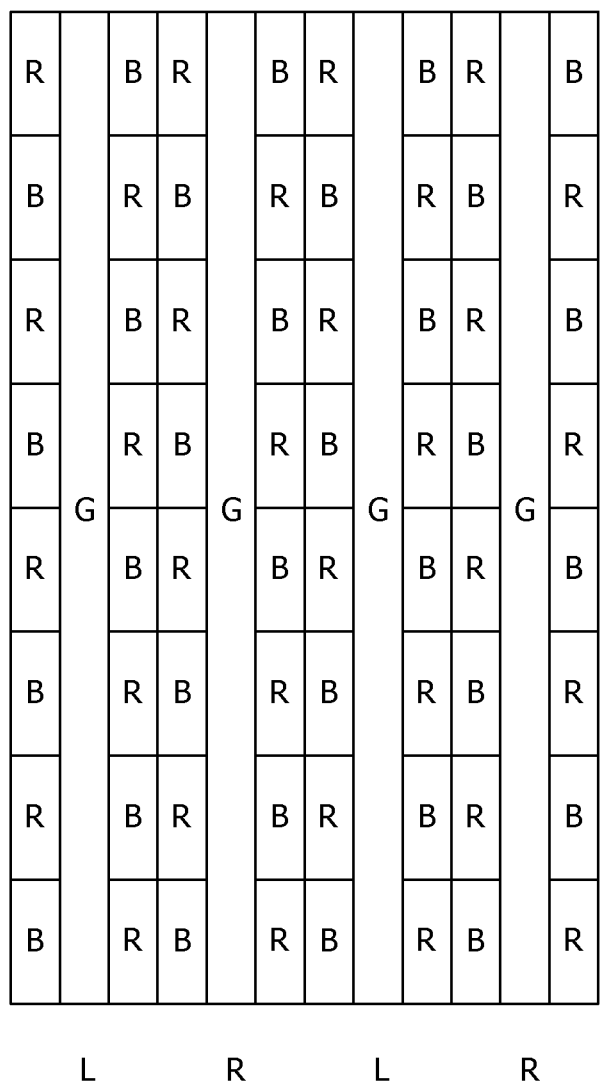
FIG. 21 is a schematic plan view showing color arrangement of color filters in a stereoscopic image displaying apparatus according to a sixth embodiment.

FIG. 21 is a schematic plan view of color arrangement of color filters according to a sixth embodiment. It is to be noted that, in the present embodiment, the parallax barrier 43 has an electrode structure similar to that of the comparative example described hereinabove with reference to FIG. 10.

Referring to FIG. 21, the color filters in the present embodiment are structured such that those for G exhibit a form of vertical stripes while those for R and B are repeated alternatively in the vertical direction in FIG. 21. Since the countermeasure against tinting is achieved by such color filter color arrangement, the electrodes exhibit a straight form in both of the landscape mode and the portrait mode like the electrode structure of the parallax barrier 43 described hereinabove with reference to FIG. 10.

FIG. 22A illustrates overlapping arrangement of parallax barrier regions 46pv and the color filters in the portrait mode. Meanwhile, FIG. 22B shows color arrangement of light from pixels entering the left (L) and right (R) eyes when the color arrangement and the parallax barrier regions overlap with each other as seen in FIG. 22A.

As seen in FIG. 22A, in the vertical direction in the portrait mode, two pixels form one set, and in the horizontal direction, two pixels for the left and the right forms one 3D pixel. As seen in FIG. 22B, among those color filters viewed by the left and right eyes, those for G are great while those for R and B are small. In order to cope with this, the luminance for G should be adjusted so as to be lower in 3D display. Therefore, even if the viewing angle is changed, the rates of the areas of the colors are not different from those as viewed from the front. Consequently, a good 3D image free from a tint can be obtained.

FIG. 23A illustrates overlapping arrangement of parallax barrier regions 46pv and the color filters in the landscape mode. Meanwhile, FIG. 23B shows color arrangement of light from pixels entering the left (L) and right (R) eyes when the color arrangement and the parallax barrier regions overlap with each other as seen in FIG. 23A.

As seen in FIG. 23A, in the landscape mode, the three colors are included uniformly in one pixel in the vertical direction, and therefore, one pixel can be used as it is as one 3D pixel. Also with regard to the color, although the colors are re-arranged, the three colors are distributed uniformly to light from pixels introduced to the eyes similarly as in the other embodiments described hereinabove. Therefore, the display image is free from tinting.

With the present sixth embodiment, since the electrode portions of the parallax barrier can be formed straight similarly as in the fifth embodiment, even if the viewing angle is deflected upwardly or downwardly, good 3D display can be achieved.

9. Modification 3

In the fifth and sixth embodiments described above, the electrode portions of the parallax barrier are formed straight to achieve a good viewing angle. However, the electrode portions of the parallax barrier may not be formed straight but may have somewhat zigzag pattern. In this instance, the degree of the zigzag formation of the parallax barrier may be set so as to achieve a good viewing angle characteristic while tinting is eliminated by color arrangement. In short, also it is possible to adjust the tinting by both of a change of the shape of the electrode portions of the barrier electrodes from a straight shape and the color arrangement.

10. Application Examples to an Electronic Apparatus

The stereoscopic image displaying apparatus according to the first to sixth embodiments and the modifications 1 to 3 described hereinabove can be applied as a display apparatus of various electronic apparatus. In particular, the display apparatus can be applied to various electronic apparatus in various fields such as, for example, digital cameras, notebook type personal computers, portable terminal apparatus such as portable telephone sets, and video cameras. In the following, several examples of the electronic apparatus to which the stereoscopic image displaying apparatus of the embodiments and modifications can be applied are described.

Figure 24:
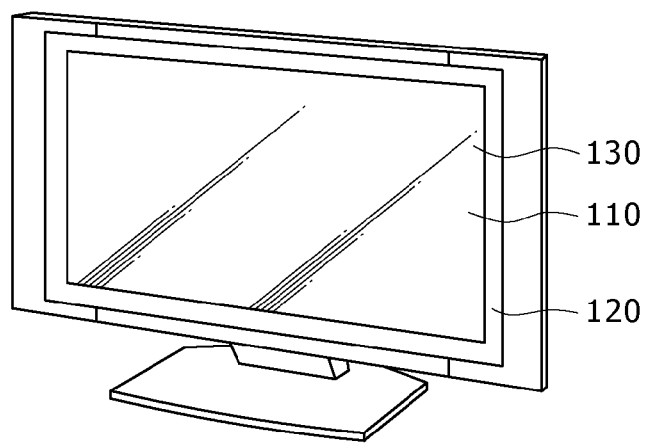
FIG. 24 is a schematic perspective view of a television set.

FIG. 24 shows a television receiver to which the present application is applied.

Referring to FIG. 24, the television receiver includes an image display screen section 110 formed from a front panel 120, a filter glass plate 130 an the like. The stereoscopic image displaying apparatus according to the second to sixth embodiments and the modifications 1 to 3 can be used as the image display screen section 110.

Figure 25A:
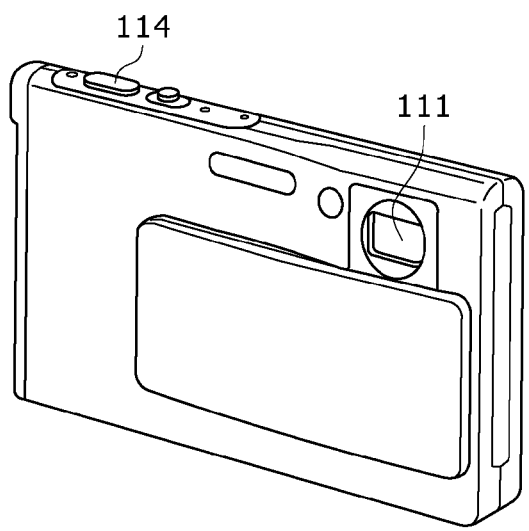
FIGS. 25A and 25B are perspective views of a digital camera as viewed from the front side and the rear side, respectively.
Figure 25B:
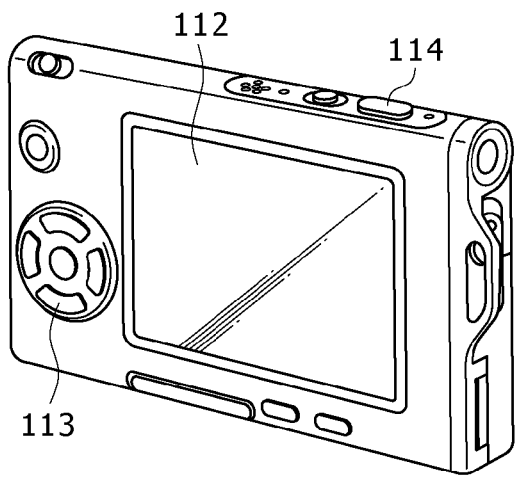

FIGS. 25A and 25B show a digital camera to which the present application is applied.

Referring to FIGS. 25A and 25B, the digital camera shown includes a flash light emitting section 111, a display section 112, a menu switch 113, a shutter button 114 and so forth. The stereoscopic image displaying apparatus according to the second to sixth embodiments and the modifications 1 to 3 can be used as the display section 112.

Figure 26:
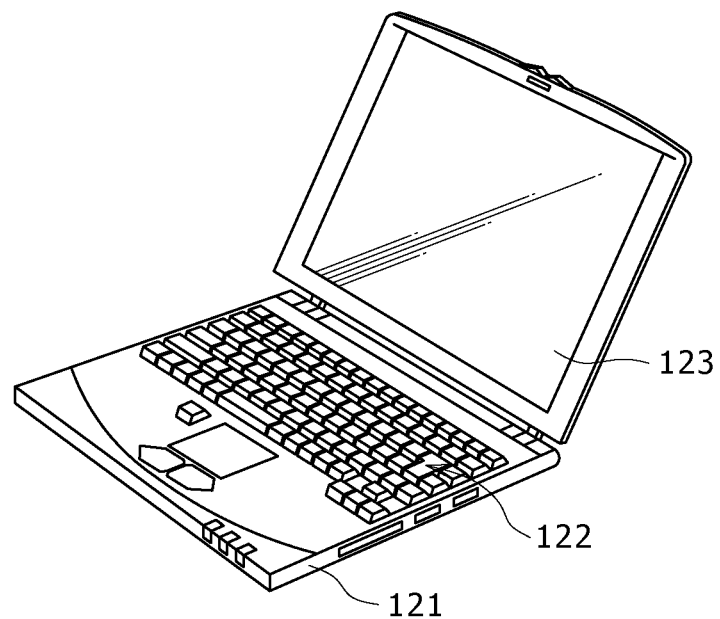
FIG. 26 is a schematic perspective view of a notebook type personal computer.

FIG. 26 shows a notebook type personal computer to which the present application is applied.

Referring to FIG. 26, the notebook type personal computer shown includes a body 121, a keyboard 122 for being operated in order to input characters and so forth, a display section 123 for displaying an image and so forth. The stereoscopic image displaying apparatus according to the second to sixth embodiments and the modifications 1 to 3 can be used as the display section 123.

Figure 27:
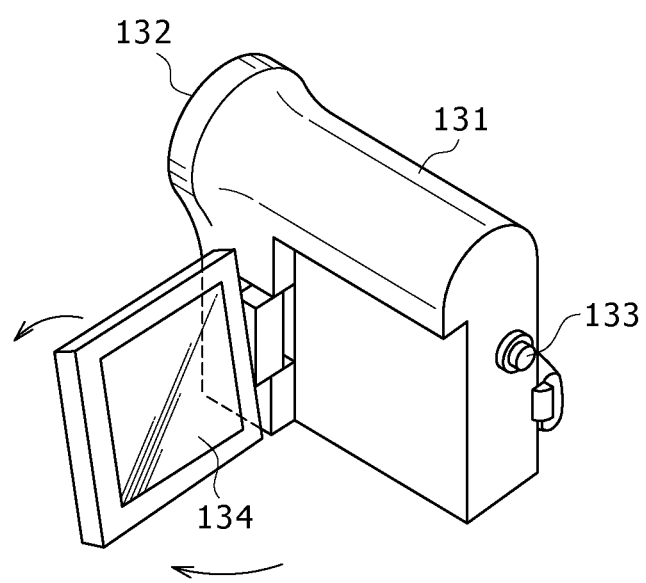
FIG. 27 is a schematic perspective view of a video camera.

FIG. 27 shows a video camera to which the present application is applied.

Referring to FIG. 27, the video camera shown includes a body section 131, and a lens 132 for picking up an image of an image pickup object, a start/stop switch 133 for image pickup, a display section 134 and so forth provided on a face of the body section 131 which is directed forwardly. The stereoscopic image displaying apparatus according to the second to sixth embodiments and the modifications 1 to 3 can be used as the display section 134.

FIGS. 28A to 28G show a portable terminal apparatus such as, for example, a portable telephone set to which the present application is applied. More particularly, FIGS. 28A and 28B show the portable telephone set in an unfolded state and FIGS. 28C to 28G show the portable telephone set in a folded state.

Referring to FIGS. 28A to 28G, the portable terminal apparatus shown includes an upper side housing 141, a lower side housing 142, a connection section 143 here in the form of a hinge section, a display section 144, a sub display section 145, a picture light 146, a camera 147 and so forth. The stereoscopic image displaying apparatus according to the second to sixth embodiments and the modifications 1 to 3 can be used as the display section 144 and the sub display section 145.

In summary, according to the stereoscopic image displaying apparatus according to the first to sixth embodiments and the modifications 1 to 3, a good image free from any tint in both of the landscape mode and the portrait mode can be displayed. Further, changeover between a two-dimensional image and a three-dimensional image can be carried out, and in two-dimensional display, a good display image can be obtained without suffering from deterioration and so forth.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A stereoscopic image displaying apparatus, comprising:
an image generation section having a plurality of pixels for a plurality of colors arranged in a two-dimensional matrix and adapted to drive the pixels for the colors to generate a color image; and
a parallax applying section adapted to apply a parallax to the color image to allow color display of a three-dimensional image and capable of changing over a parallax direction between a first direction of the color image and a second direction perpendicular to the first direction;
said parallax applying section having a first parallel state where a longitudinal direction of a plurality of parallax barrier regions of a parallax barrier spaced from each other for applying the parallax coincides with the first direction and a second parallel state where the longitudinal direction of the parallax barrier regions of said parallax barrier coincides with the second direction;
said image generation section and said parallax application section being configured so that the rates of the colors at the pixels for the colors corresponding to light transmission regions between adjacent ones of said parallax barrier regions are uniform or got closer in both of the first parallel state and the second parallel state.

2. The stereoscopic image displaying apparatus according to claim 1, wherein each of the parallax barrier regions of said parallax barrier of said parallax applying section has a shape including a plurality of rectangular portions which are displaced from each other in a direction perpendicular to the longitudinal direction in at least one of the first parallel state and the second parallel state so that the rates of the colors at the pixels for the colors corresponding to the light transmission regions between adjacent ones of said parallax barrier regions are uniform or got closer in both of the first parallel state and the second parallel state.

3. The stereoscopic image displaying apparatus according to claim 2, wherein each of said pixels includes a plurality of subpixels, and the shift amount which represents the magnitude of the displacement between the rectangular portions of the shape of the parallax barrier region of said parallax barrier is determined in accordance with a natural number of times a minimum unit which is 1/n the width of the subpixels, n being an arbitrary natural number.

4. The stereoscopic image displaying apparatus according to claim 3, wherein the size and the direction of offsets formed on a pattern profile of each of the parallax barrier region of said parallax barrier in accordance with the displacements of the rectangular portions of the parallax barrier regions and the ratio at which the offsets are provided are determined so that the rates of the colors of color filters opened from between each two adjacent ones of the parallax barrier region of said parallax barrier are uniform or got closer in both of the first parallel state and the second parallel state of the parallax barrier region of said parallax barrier.

5. The stereoscopic image displaying apparatus according to claim 3, wherein different color filters are arranged in a plurality of subpixels included in each of said pixels and in the form of parallel stripes each of which is formed as a color stripe from the subpixels of the same color in the matrix arrangement of the pixels, and the displacement direction of the rectangular portions of the parallax barrier region of said parallax barrier is a color stripe separation direction perpendicular to the direction of the color strips of said color filters.

6. The stereoscopic image displaying apparatus according to claim 5, wherein said parallax applying section includes:
a liquid crystal layer;
first and second electrodes disposed on a first side of said liquid crystal layer in a layer thicknesswise direction of said liquid crystal layer and each having a plurality of electrode portions in the form of parallel stripes elongated in the color stripe separation direction, the electrode portions of said first and second electrodes being disposed alternately in the color stripe direction such that, in the first parallel state, the electrode portions of one of said first and second electrodes correspond to parallax barrier regions of said parallax barrier while the electrode portions of the other one of said first and second electrodes correspond to slits between the parallax barrier regions; and
third and fourth electrodes disposed on a second side of said liquid crystal layer in the layer thicknesswise direction and each having a plurality of electrode portions elongated in the color strip direction and shaped such that N shifts of the rectangular electrode portions are repeated alternately in one direction and the other direction of the color stripe separation direction, N being an integer equal to or greater than one, the electrode portions of said third and fourth electrodes being disposed alternately in the color stripe separation direction such that, in the second parallel state, the electrode portions of one of said third and fourth electrodes correspond to the parallax barrier regions of said parallax barrier while the electrode portions of the other one of said third and fourth electrodes correspond to the slits between the parallax barrier regions.

7. The stereoscopic image displaying apparatus according to claim 6, wherein the shift amount of the rectangular electrode portions of said third and fourth electrodes corresponds to the size of a subpixel and the number of times by which the rectangular electrode portions shift successively in one direction is equal to a natural number of times of M−1 where M is the number of colors in each pixel, the successive shifts whose number is equal to the natural number of times the color number M being repeated with the direction of the shifts changed alternately such that the electrode portions of at least one of said third and fourth electrodes is disposed in a generally meandering shape.

8. The stereoscopic image displaying apparatus according to claim 7, wherein the electrode portions of said third and fourth electrodes have a width in the color stripe separation direction which is greater than the width of one sub pixel but smaller than a total width of three subpixels.

9. The stereoscopic image displaying apparatus according to claim 7, wherein the width of the electrode portions of said third electrode corresponds to the width of one pixel and the width of the electrode portions of said fourth electrode is greater than the width of one pixel by an amount corresponding to twice a spacing distance between the electrode portions of said fourth electrode.

10. The stereoscopic image displaying apparatus according to claim 6, wherein the shift amount of the rectangular electrode portions of said third and fourth electrodes corresponds to the size of a subpixel and each of the electrode portions of said third and fourth electrodes is shaped such that one shift of the rectangular electrode portions is repeated alternately in one direction and the other direction of the color stripe separation direction.

11. The stereoscopic image displaying apparatus according to claim 10, wherein the electrode portions of said third and fourth electrodes have a width in the color stripe separation direction which is greater than the width of one sub pixel but smaller than a total width of two subpixels.

12. The stereoscopic image displaying apparatus according to claim 10, wherein each two ones of the rectangular electrode portions displaced from each other by the one shift overlap with halves of different subpixels of the same color such that the two rectangular electrode portions have an area corresponding to a total area of all sub pixels in one pixel.

13. The stereoscopic image displaying apparatus according to claim 2, wherein said parallax applying section includes:

a liquid crystal layer;

first and second electrodes disposed on a first side of said liquid crystal layer in a layer thicknesswise direction of said liquid crystal layer and each having a plurality of electrode portions in the form of parallel stripes elongated in the second direction, the electrode portions of said first and second electrodes being disposed alternately in the first direction such that, in the first parallel state, the electrode portions of one of said first and second electrodes correspond to parallax barrier regions of said parallax barrier while the electrode portions of the other one of said first and second electrodes correspond to slits between the parallax barrier regions; and third and fourth electrodes disposed on a second side of said liquid crystal layer in the layer thicknesswise direction and each having a plurality of electrode portions elongated in the first direction and shaped such that N shifts of the rectangular electrode portions are repeated alternately in one direction and the other direction of the second direction, N being an integer equal to or greater than one, the electrode portions of said third and fourth electrodes being disposed alternately in the second direction such that, in the second parallel state, the electrode portions of one of said third and fourth electrodes correspond to the parallax barrier regions of said parallax barrier while the electrode portions of the other one of said third and fourth electrodes correspond to the slits between the parallax barrier regions.

\* \* \* \* \*